US010836154B2

(12) United States Patent
Nagasu et al.

(10) Patent No.: US 10,836,154 B2
(45) Date of Patent: Nov. 17, 2020

(54) LIQUID EJECTION APPARATUS, LIQUID EJECTION SYSTEM, AND LIQUID EJECTION METHOD

(71) Applicants: Tsuyoshi Nagasu, Kanagawa (JP); Tomoaki Hayashi, Tokyo (JP); Masayuki Sunaoshi, Ibaraki (JP); Koichi Kudo, Kanagawa (JP); Masahiro Mizuno, Kanagawa (JP)

(72) Inventors: Tsuyoshi Nagasu, Kanagawa (JP); Tomoaki Hayashi, Tokyo (JP); Masayuki Sunaoshi, Ibaraki (JP); Koichi Kudo, Kanagawa (JP); Masahiro Mizuno, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/243,399

(22) Filed: Jan. 9, 2019

(65) Prior Publication Data

US 2019/0143675 A1 May 16, 2019

Related U.S. Application Data

(63) Continuation of application No. 15/382,963, filed on Dec. 19, 2016, now Pat. No. 10,207,494.

(30) Foreign Application Priority Data

Dec. 25, 2015 (JP) .................. 2015-255355
Nov. 29, 2016 (JP) .................. 2016-231594

(51) Int. Cl.
  *B41J 2/045* (2006.01)
  *B41J 2/21* (2006.01)
  (Continued)

(52) U.S. Cl.
  CPC ....... *B41J 2/04505* (2013.01); *B41J 2/04586* (2013.01); *B41J 2/2132* (2013.01); (Continued)

(58) Field of Classification Search
  CPC .... B41J 2/04505; B41J 2/2132; B41J 15/046; B41J 25/001; B41J 2/04586; G01B 11/002
  See application file for complete search history.

(56) References Cited

U.S. PATENT DOCUMENTS 7,445,313 B2    11/2008   Tsutsumi et al.
9,028,027 B2    5/2015    Bell et al.
(Continued)

FOREIGN PATENT DOCUMENTS

JP    2003-266828    9/2003
JP    2005-280051    10/2005
(Continued)

OTHER PUBLICATIONS

European Office Action for 16205274.0 dated Jul. 5, 2019.
Extended European Search Report for 16205274.0 dated Aug. 28, 2017.

*Primary Examiner* — Justin Seo
(74) *Attorney, Agent, or Firm* — IPUSA, PLLC

(57) ABSTRACT

A liquid ejection apparatus includes a plurality of liquid ejection head units that eject liquid onto a conveyed object at different positions along a conveying path; a first support member and a second support member that are respectively provided at an upstream side and a downstream side of a landing position of liquid ejected by a corresponding liquid ejection head unit; a first detection unit that is installed between the first support member and the second support member and is configured to detect a position of the conveyed object in a direction orthogonal to a conveying direction of the conveyed object; a second detection unit that (Continued)

is installed upstream of the first detection unit; and a movement control unit that moves each liquid ejection head unit based on a plurality of detection results output by the first detection unit and/or the second detection unit.

15 Claims, 23 Drawing Sheets

(51) Int. Cl.
    *B41J 15/04*     (2006.01)
    *B41J 25/00*     (2006.01)
    *G01B 11/00*     (2006.01)

(52) U.S. Cl.
    CPC ........... *B41J 15/046* (2013.01); *B41J 25/001* (2013.01); *G01B 11/002* (2013.01)

(56) References Cited

U.S. PATENT DOCUMENTS

| | | |
|---|---|---|
| 9,440,431 B2 | 9/2016 | Hommi |
| 9,744,759 B2 | 8/2017 | Inoue |
| 2003/0128373 A1 | 7/2003 | Hayashi et al. |
| 2007/0188575 A1 | 8/2007 | Nakazawa |
| 2009/0115807 A1 | 5/2009 | Tanaka et al. |
| 2009/0160900 A1* | 6/2009 | Niida ................ B41J 29/393 347/19 |
| 2010/0149248 A1 | 6/2010 | Enomoto |
| 2015/0290931 A1* | 10/2015 | Boland ................ B41J 2/2146 347/14 |
| 2016/0075155 A1* | 3/2016 | Fukui ................ B41J 2/01 347/16 |
| 2016/0121602 A1 | 5/2016 | Nagasu et al. |

FOREIGN PATENT DOCUMENTS

| | | |
|---|---|---|
| JP | 2007-069428 | 3/2007 |
| JP | 2007-210244 | 8/2007 |
| JP | 2011-126204 | 6/2011 |
| JP | 2014-189337 | 10/2014 |
| JP | 2015-013476 | 1/2015 |

\* cited by examiner

FIG.9A
FIG.9B
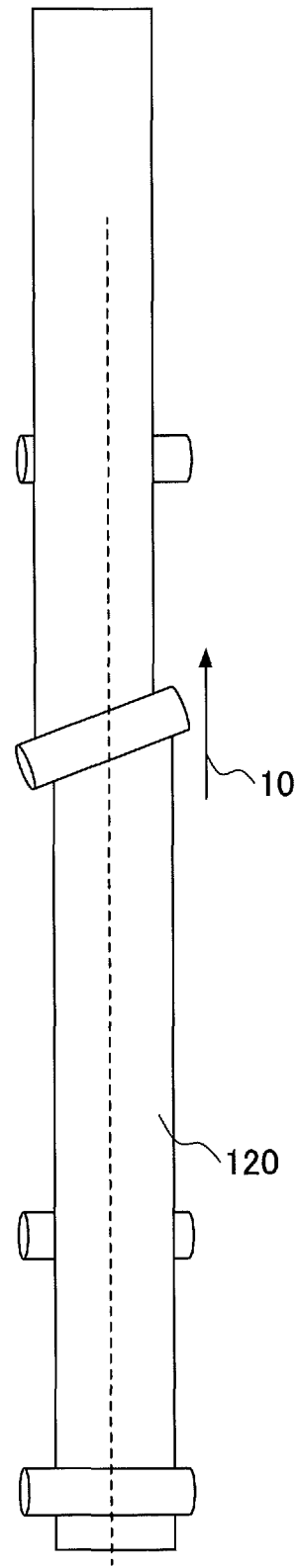
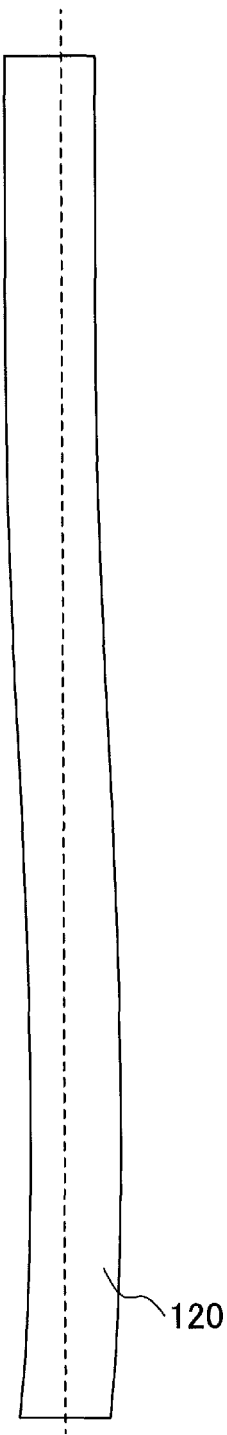

LIQUID EJECTION APPARATUS, LIQUID EJECTION SYSTEM, AND LIQUID EJECTION METHOD

CROSS-REFERENCE TO RELATED APPLICATIONS

The present application is a continuation application and claims priority under 35 U.S.C. 120 to U.S. patent application Ser. No. 15/382,963 filed on Dec. 19, 2016, which claims priority under 35 U.S.C. § 119 to Japanese Patent Application No. 2015-255355 filed on Dec. 25, 2015 and Japanese Patent Application No. 2016-231594 filed on Nov. 29, 2016. The entire contents of foregoing applications are incorporated herein by reference.

BACKGROUND OF THE INVENTION

1. Field of the Invention

The present disclosure relates to a liquid ejection apparatus, a liquid ejection system, and a liquid ejection method.

2. Description of the Related Art

Techniques for forming an image using the so-called inkjet method that involves ejecting ink from a print head are known. Also, techniques are known for improving the print quality of an image printed on a print medium using such image forming techniques.

For example, a method for improving print quality by adjusting the position of a print head is known. Specifically, such method involves using a sensor to detect positional variations in a transverse direction of a web corresponding to a print medium that passes through a continuous paper printing system. The method further involves adjusting the position of the print head in the transverse direction in order to compensate for the positional variations detected by the sensor (e.g., see Japanese Unexamined Patent Publication No. 2015-13476).

SUMMARY OF THE INVENTION

According to one embodiment of the present invention, a liquid ejection apparatus is provided that includes a plurality of liquid ejection head units that are configured to eject liquid onto a conveyed object at different positions along a conveying path for conveying the conveyed object, a first support member that supports the conveyed object and is provided upstream of a landing position of the liquid ejected onto the conveyed object by a corresponding liquid ejection head unit of the plurality of liquid ejection head units, a second support member that supports the conveyed object and is provided downstream of the landing position of the corresponding liquid ejection head unit, at least one first detection unit that is installed between the first support member and the second support member and is configured to detect a position of the conveyed object with respect to an orthogonal direction that is orthogonal to a conveying direction of the conveyed object, at least one second detection unit that is installed upstream of the first detection unit and is configured to detect the position of the conveyed object with respect to the orthogonal direction, and a movement control unit that is configured to move each liquid ejection head unit of the plurality of liquid ejection head units based on at least two detection results selected from a plurality of detection results output by the first detection unit and the second detection unit.

BRIEF DESCRIPTION OF THE DRAWINGS

FIGS. 9A and 9B are diagrams illustrating example variations in the position of a recording medium with respect to an orthogonal direction;

DESCRIPTION OF THE EMBODIMENTS

Figure 1:
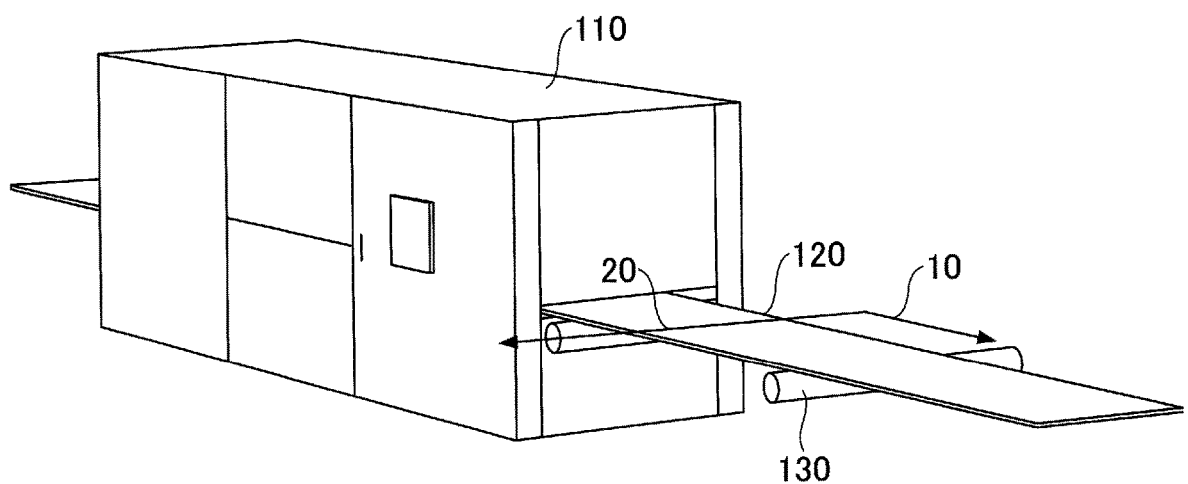
FIG. 1 is a schematic perspective view of a liquid ejection apparatus according to an embodiment of the present invention.

One aspect of the present invention is directed to providing a liquid ejection apparatus that is capable of improving accuracy of a landing position of ejected liquid in a direction orthogonal to a conveying direction of a conveyed object.

In the following, embodiments of the present invention are described with reference to the accompanying drawings. Note that elements described in the present description and the drawings that have substantially identical functional features are given the same reference numerals and overlapping explanations may be omitted.

<Overall Configuration>

FIG. 1 is a schematic diagram illustrating an example liquid ejection apparatus according to an embodiment of the present invention. For example, a liquid ejection apparatus according to an embodiment of the present invention may be an image forming apparatus 110 as illustrated in FIG. 1. Liquid ejected by such an image forming apparatus 110 may be recording liquid, such as aqueous ink or oil-based ink, for example. Hereinafter, the image forming apparatus 110 is described as an example liquid ejection apparatus according to an embodiment of the present invention.

A conveyed object conveyed by the image forming apparatus 110 may be a recording medium, for example. In the illustrated example, the image forming apparatus 110 ejects liquid on a web 120 corresponding to an example of a recording medium that is conveyed by a roller 130 to form an image thereon. Also, note that the web 120 may be a so-called continuous paper print medium, for example. That is, the web 120 may be a rolled sheet that is capable of being wound up, for example. Thus, the image forming apparatus 110 may be a so-called production printer. In the following, an example is described where the roller 130 adjusts the tension of the web 120 and conveys the web 120 in a direction indicated by arrow 10 (hereinafter referred to as "conveying direction 10"). Further, a direction orthogonal to the conveying direction 10 as indicated by arrow 20 in FIG. 1 is referred to as "orthogonal direction 20". In the present example, it is assumed that the image forming apparatus 110 corresponds to an inkjet printer that forms an image on the web 120 by ejecting inks in four different colors, including black (K), cyan (C), magenta (M), and yellow (Y), at predetermined portions of the web 120.

Figure 2:
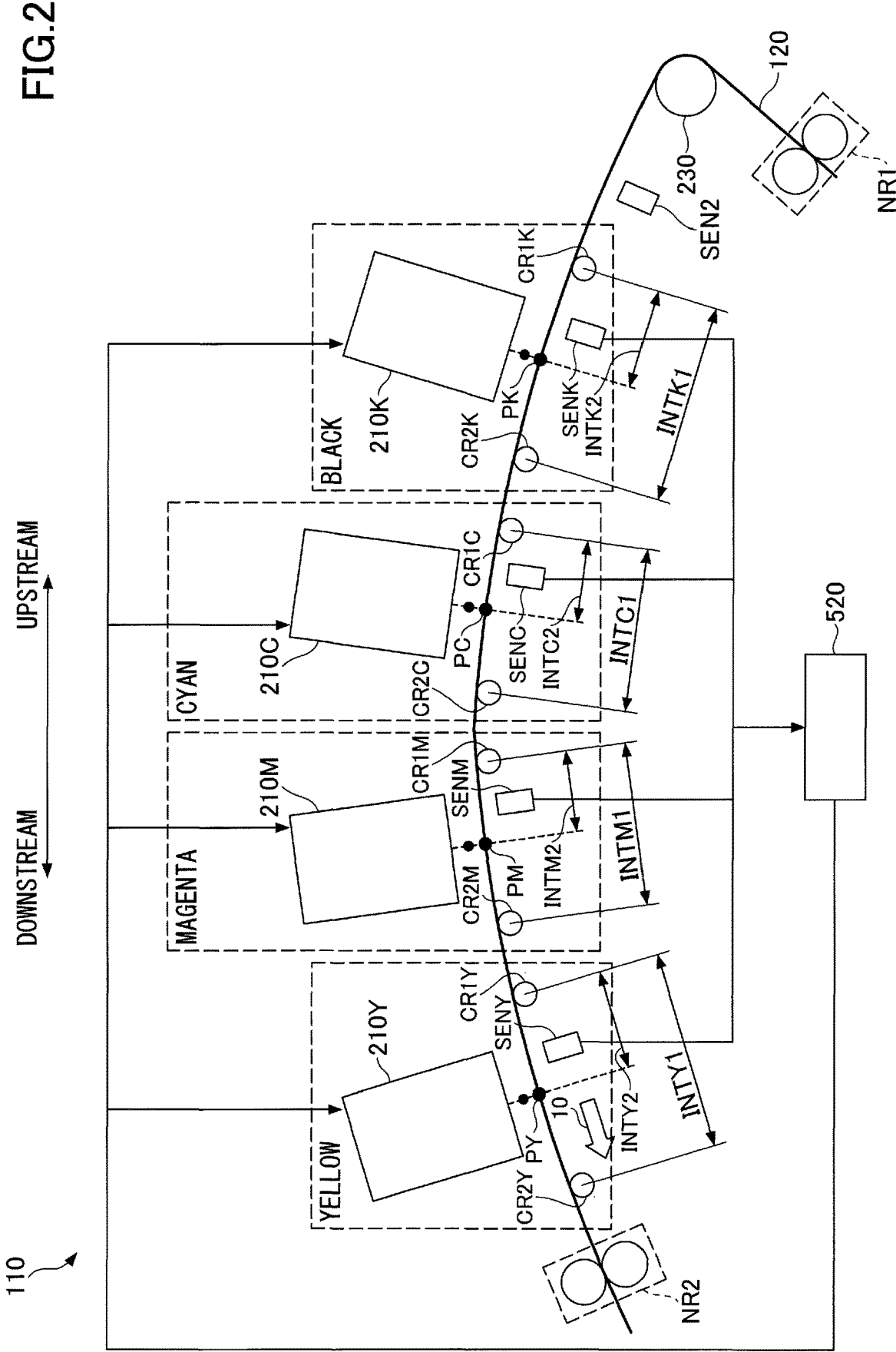
FIG. 2 is a schematic diagram illustrating an example overall configuration of the liquid ejection apparatus according to an embodiment of the present invention.

FIG. 2 is a schematic diagram illustrating an example overall configuration of the liquid ejection apparatus according to an embodiment of the present invention. In FIG. 2, the image forming apparatus 110 includes four liquid ejection head units for ejecting inks in the above four different colors.

Each liquid ejection head unit ejects ink in a corresponding color on the web 120 that is being conveyed in the conveying direction 10. Also, the web 120 is conveyed by two pairs of nip rollers NR1 and NR2, a roller 230, and the like. Hereinafter, the pair of nip rollers NR1 that is arranged upstream of the liquid ejection head units is referred to as "first nip rollers NR1". On the other hand, the pair of nip rollers NR2 that is arranged downstream of the first nip rollers NR1 and the liquid ejection head units is referred to as "second nip rollers NR2". Each pair of the nip rollers NR1 and NR2 is configured to rotate while holding a conveyed object, such as the web 120, therebetween. As described above, the first and second nip rollers NR1 and NR2 and the roller 230 may constitute a mechanism for conveying the web 120 in a predetermined direction.

Note that a recording medium to be conveyed, such as the web 120, is preferably relatively long. Specifically, the length of the recording medium is preferably longer than the distance between the first nip rollers NR1 and the second nip rollers NR2. Further, note that the recording medium is not limited to the web 120. For example, the recording medium may also be a folded sheet, such as the so-called "Z paper" that is stored in a folded state.

In the present example, it is assumed that the liquid ejection head units for the four different colors are arranged in the following order from the upstream side to the downstream side: black (K), cyan (C), magenta (M), and yellow (Y). That is, the liquid ejection head unit for black (K) (hereinafter referred to as "black liquid ejection head unit 210K") is installed at the most upstream side. The liquid ejection head unit for cyan (C) (hereinafter referred to as "cyan liquid ejection head unit 210C") is installed next to the black liquid ejection head unit 210K. The liquid ejection head unit for magenta (M) (hereinafter referred to as "magenta liquid ejection head 210M") is installed next to the cyan liquid ejection head unit 210C. The liquid ejection head unit for yellow (Y) (hereinafter referred to as "yellow liquid ejection head unit 210Y") is installed at the most downstream side.

The liquid ejection head units 210K, 210C, 210M, and 210Y are configured to eject ink in their respective colors on predetermined portions of the web 120 based on image data, for example. A position at which ink is ejected (hereinafter referred to as "landing position") may be substantially the same as the position where the ink ejected from the liquid ejection head unit lands on the recording medium; i.e., directly below the liquid ejection head unit. In the present example, black ink is ejected onto a landing position of the black liquid ejection head unit 210K (hereinafter referred to as "black landing position PK"). Similarly, cyan ink is ejected onto a landing position of the cyan liquid ejection head unit 210C (hereinafter referred to as "cyan landing position PC"). Further, magenta ink is ejected onto a landing position of the magenta liquid ejection head unit 210M (hereinafter referred to as "magenta landing position PM"). Also, yellow ink is ejected onto a landing position of the yellow liquid ejection head unit 210Y (hereinafter referred to as "yellow landing position PY"). Note that the timing at which each of the liquid ejection head units ejects ink may be controlled by a controller 520 that is connected to each of the liquid ejection head units.

Also, multiple rollers are installed with respect to each of the liquid ejection head units. For example, rollers may be installed at the upstream side and the downstream side of each of the liquid ejection head units. In the example illustrated in FIG. 2, a roller used to convey the web 120 to the landing position of a liquid ejection head unit (hereinafter referred to as "first roller") is disposed on the upstream side of each liquid ejection head unit. Also, a roller used to convey the web 120 downstream from the landing position (hereinafter referred to as "second roller") is disposed on the downstream side of each liquid ejection head unit. By arranging the first roller and the second roller at the upstream side and downstream side of the landing position of each liquid ejection head unit, the so-called "fluttering" effect may be reduced, for example. Note that the first roller and the second roller are examples of support members used to convey the recording medium and may be driven rollers, for example. The first roller and the second roller may be also be drive rollers, for example.

Note that the first roller, as an example of a first support member, and the second roller, as an example of a second support member, do not have to be rotating bodies and may be driven rollers, for example. That is, any suitable member capable of supporting a conveyed object may be used as the first roller and the second roller. For example, a pipe or a shaft having a circular cross-sectional shape may be used as the first support member and the second roller support member. Also, in another example, a curved plate having an arc-shaped portion that comes into contact with a conveyed object may be used as the first support member and the second support member. In the following, the first roller is described as an example of a first support member and the second roller is described as an example of a second support member.

Specifically, with respect to the black liquid ejection head unit 210K, a first roller CR1K used for conveying the web 120 to the black landing position PK to eject black ink onto a predetermined portion of the web 120 is arranged at the upstream side of the black liquid ejection head unit 210K. Also, a second roller CR2K used for conveying the web 120 further downstream of the black landing position PK is arranged at the downstream side of the black liquid ejection head unit 210K. Similarly, a first roller CR1C and a second roller CR2C are respectively arranged at the upstream side and downstream side of the cyan liquid ejection head unit 210C. Further, a first roller CR1M and a second roller CR2M are respectively arranged at the upstream side and downstream side of the magenta liquid ejection head unit 210M. Further, a first roller CR1Y and a second roller CR2Y are respectively arranged at the upstream side and downstream side of the yellow liquid ejection head unit 210Y.

In the following, an example external configuration of the liquid ejection head units is described with reference to FIGS. 3A and 3B.

Figure 3A:
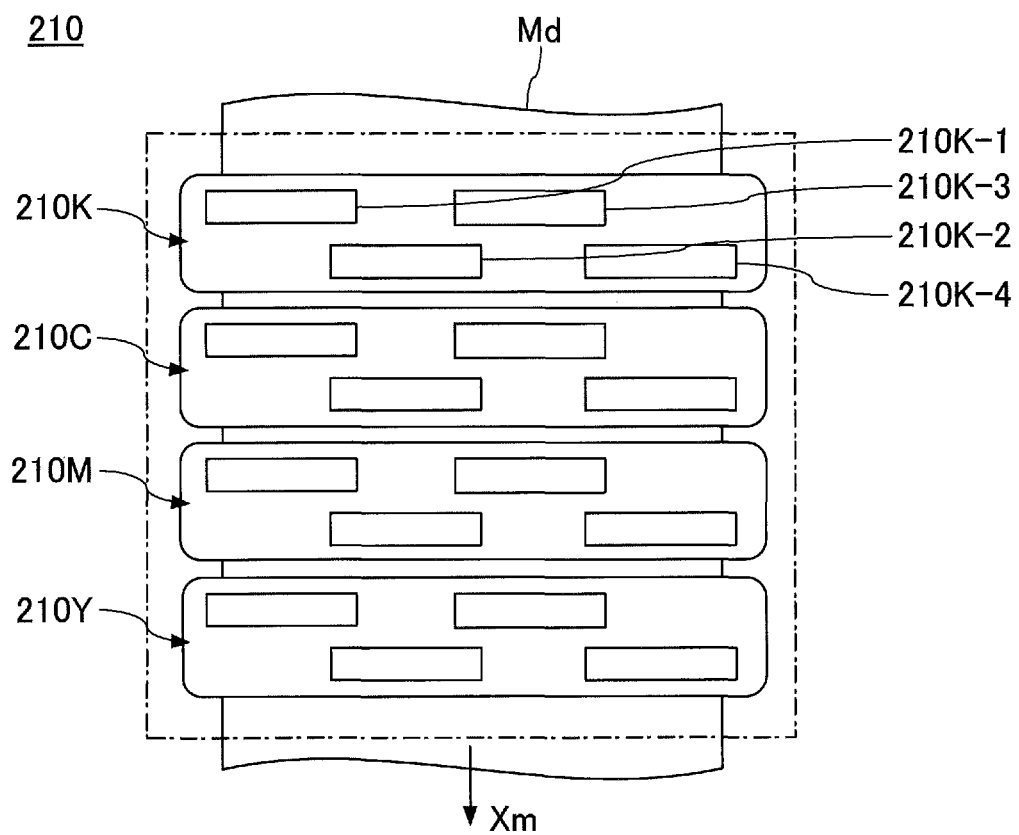
FIGS. 3A and 3B are diagrams illustrating an example external configuration of a liquid ejection head according to an embodiment of the present invention.
Figure 3B:
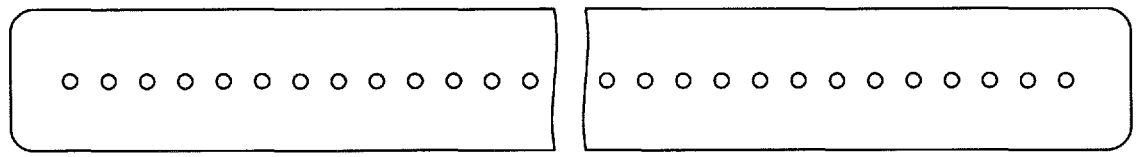

FIG. 3A is a schematic plan view of the four liquid ejection head units 210K, 210C, 210M, and 210Y included in the image forming apparatus 110 according to the present embodiment. FIG. 3B is an enlarged plan view of a head 210K-1 of the liquid ejection head unit 210K for ejecting black (K) ink.

In FIG. 3A, the liquid ejection head units are full-line type head units. That is, the image forming apparatus 110 has the four liquid ejection head units 210K, 210C, 210M, and 210Y for the four different colors, black (K), cyan (C), magenta (M), and yellow (Y), arranged in the above recited order from the upstream side to the downstream side in the conveying direction 10.

The liquid ejection head unit 210K for ejecting black (K) ink includes four heads 210K-1, 210K-2, 210K-3, and 210K-4, arranged in a staggered manner in the orthogonal direction 20 orthogonal to the conveying direction 10. This enables the image forming apparatus 110 to form an image across the entire width of an image forming region (print region) of the web 120. Note that the configurations of the other liquid ejection head units 210C, 210M, and 210Y may be similar to that of the liquid ejection head unit 210K, and as such, descriptions thereof will be omitted.

Note that although an example where the liquid ejection head unit is made up of four heads is described above, the liquid ejection head unit may also be made up of a single head, for example.

<Detection Unit>

In the present embodiment, a sensor as an example of a detection unit for detecting a position of a recording medium in the orthogonal direction is installed in the liquid ejection apparatus in addition to sensors that are installed for the respective liquid ejection head units. In the example illustrated in FIG. 2, four sensors SENK, SENC, SENM, and SENY are respectively installed for the four liquid ejection head units 210K, 210C, 210M, and 210Y. In addition, one sensor SEN2 is installed upstream of the above four sensors. That is, a total of five sensors are installed in the liquid ejection apparatus illustrated in FIG. 2. Note that in the following descriptions, the sensors that are installed for the respective liquid ejection head units are referred to as "first sensors", and the sensor that is installed upstream of the first sensors is referred to as "second sensor". Also, the first and second sensors may generically be referred to as "sensor(s)".

In the following, an example case where a total of five sensors are provided in the liquid ejection apparatus is described. Note, however, that the total number of sensors is not limited to such a number. That is, the total number of the first and second sensors may be any number greater than the total number of liquid ejection head units provided in the liquid ejection apparatus. For example, two or more first sensors may be provided with respect to each of the liquid ejection head units. Similarly, two or more second sensors may be provided upstream of the first sensors, for example.

The sensor may be a laser sensor, a pneumatic sensor, a photoelectric sensor, an ultrasonic sensor, or an optical sensor that uses light such as infrared light, for example. Note that an example of an optical sensor includes a CCD (Charge Coupled Device) camera. That is, the sensor constituting the first/second detection unit may be a sensor that is capable of detecting the edge of the recording medium, for example. Note that the first and second sensors may all be the same type of sensor, or they may be different types of sensors. In the following, it is assumed that all the sensors are of the same type. Also, each sensor may have a configuration as described below, for example.

Figure 4:
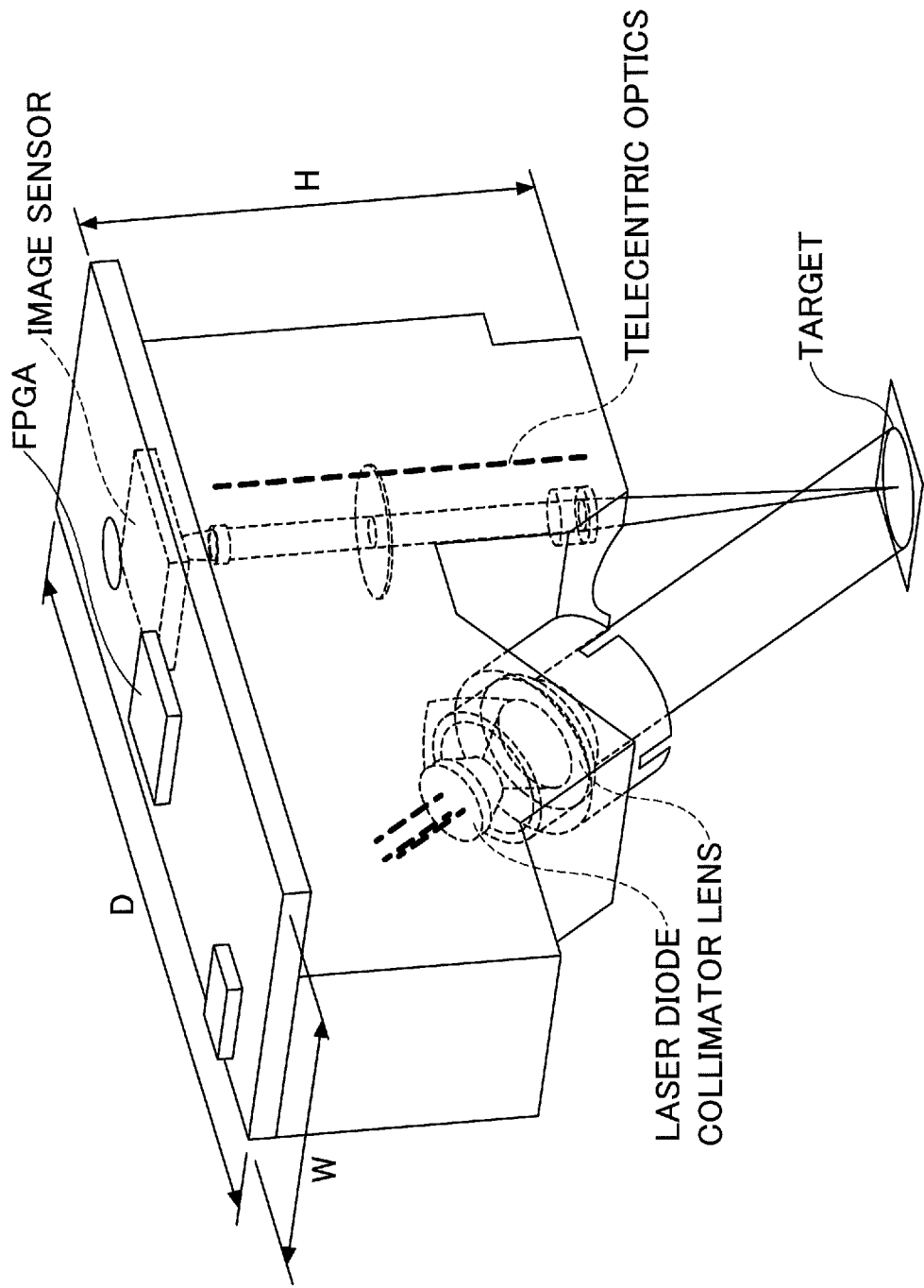
FIG. 4 is an external view of a detection device according to an embodiment of the present invention.

FIG. 4 is an external view of an example detection device (sensor) implementing the detection unit according to an embodiment of the present invention.

The sensor illustrated in FIG. 4 performs detection by capturing an image of a speckle pattern that is formed when light from a light source is incident on a conveyed object, such as the web 120, for example. Specifically, the sensor includes a semiconductor laser diode (LD) and an optical system such as a collimator lens (CL). Further, the sensor includes a CMOS (Complementary Metal Oxide Semiconductor) image sensor for capturing an image of a speckle pattern and a telecentric optical imaging system (telecentric optics) for imaging the speckle pattern on the CMOS image sensor.

In the example illustrated in FIG. 4, for example, the CMOS image sensor may capture an image of the speckle pattern multiple times, such as at time t1 and at time t2. Then, based on the image captured at time t1 and the image captured at time t2, a calculating device, such as a FPGA (Field-Programmable Gate Array) circuit, may perform a process such as cross-correlation calculation. Then, based on the movement of the correlation peak position calculated by the correlation calculation, the sensor may output the amount of movement of the conveyed object from time t1 to time t2, for example. Note that in the illustrated example, it is assumed that the width (W)×depth (D)×height (H) dimensions of the sensor is 15 mm×60 mm×32 mm.

Also, note that the CMOS image sensor is an example of hardware for implementing an imaging unit, and the FPGA circuit is an example of a calculating device.

Also, the correlation calculation may be performed in the following manner, for example.

<Correlation Calculation>

Figure 5:
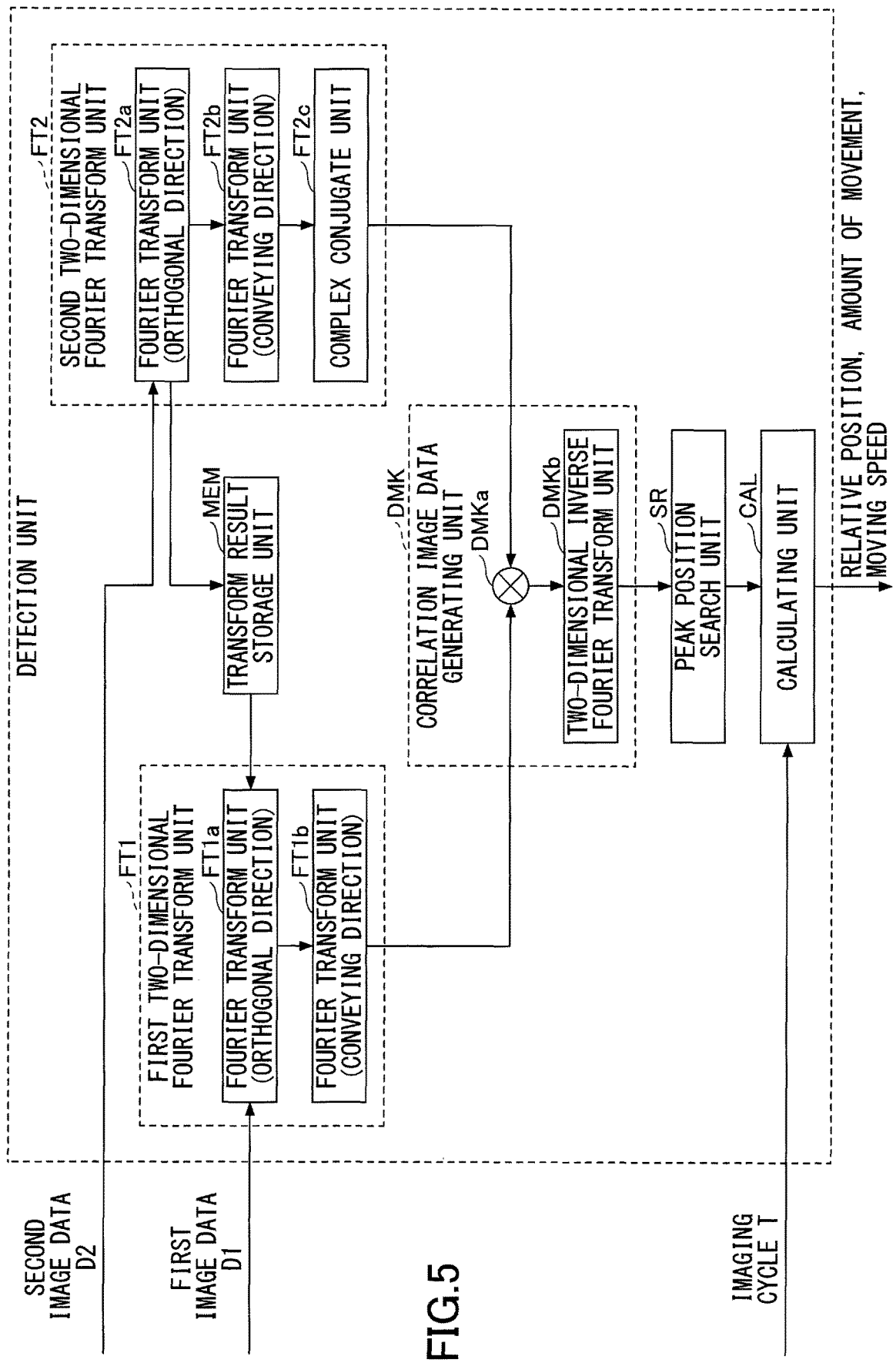
FIG. 5 is a block diagram illustrating an example functional configuration of the detection unit for implementing a correlation calculation according to an embodiment of the present invention.

FIG. 5 is a diagram illustrating an example correlation calculation method implemented by the detection unit according to an embodiment of the present invention. For example, the detection unit may perform a correlation calculation operation as illustrated in FIG. 5 to calculate a relative position of the web 120 with respect to the position of a sensor, an amount of movement of the web 120, and/or the moving speed of the web 120.

In the example illustrated in FIG. 5, the detection unit includes a first two-dimensional Fourier transform unit FT1, a second two-dimensional Fourier transform unit FT2, a correlation image data generating unit DMK, a peak position search unit SR, a calculating unit CAL, and a transform result storage unit MEM.

The first two-dimensional Fourier transform unit FT1 transforms first image data D1. Specifically, the first two-dimensional Fourier transform unit FT1 includes a Fourier transform unit FT1a for the orthogonal direction and a Fourier transform unit FT1b for the conveying direction.

The Fourier transform unit FT1a for the orthogonal direction applies a one-dimensional Fourier transform to the first image data D1 in the orthogonal direction. Then, the Fourier transform unit FT1b for the conveying direction applies a one-dimensional Fourier transform to the first image data D1 in the conveying direction based on the transform result obtained by the Fourier transformation unit FT1a for the orthogonal direction. In this way, the Fourier transform unit FT1a for the orthogonal direction and the Fourier transform unit FT1b for the conveying direction may respectively apply one-dimensional Fourier transforms in the orthogonal direction and the conveying direction. The first two-dimensional Fourier transform unit FT1 then outputs the transform result to the correlation image data generating unit DMK.

Similarly, the second two-dimensional Fourier transform unit FT2 transforms second image data D2. Specifically, the second two-dimensional Fourier transform unit FT2 includes a Fourier transform unit FT2a for the orthogonal direction, a Fourier transform unit FT2b for the conveying direction, and a complex conjugate unit FT2c.

The Fourier transform unit FT2a for the orthogonal direction applies a one-dimensional Fourier transform to the second image data D2 in the orthogonal direction. Then, the Fourier transformation unit FT2b for the conveying direction applies a one-dimensional Fourier transformation to the second image data D2 in the conveying direction based on the transform result obtained by the Fourier transformation unit FT2a for the orthogonal direction. In this way, the Fourier transform unit FT2a for the orthogonal direction and the Fourier transform unit FT2b for the conveying direction may respectively apply one-dimensional Fourier transforms in the orthogonal direction and the conveying direction.

Then, the complex conjugate unit FT2c calculates the complex conjugate of the transform results obtained by the Fourier transform unit FT2a for the orthogonal direction and the Fourier transform unit FT2b for the conveying direction. Then, the second two-dimensional Fourier transform unit FT2 outputs the complex conjugate calculated by the complex conjugate unit FT2c to the correlation image data generating unit DMK.

Then, the correlation image data generating unit DMK compares the transform result of the first image data D1 output by the first two-dimensional Fourier transform unit FT1 and the transform result of the second image data D2 output by the second two-dimensional Fourier transform unit FT2.

The correlation image data generating unit DMK includes an integration unit DMKa and a two-dimensional inverse Fourier transform unit DMKb.

The integration unit DMKa integrates the transform result of the first image data D1 and the transform result of the second image data D2. The integration unit DMKa then outputs the integration result to the two-dimensional inverse Fourier transform unit DMKb.

The two-dimensional inverse Fourier transform unit DMKb applies a two-dimensional inverse Fourier transform to the integration result obtained by the integration unit DMKa. By applying the two-dimensional inverse Fourier transform to the integration result in the above-described manner, correlation image data may be generated. Then, the two-dimensional inverse Fourier transform unit DMKb outputs the generated correlation image data to the peak position search unit SR.

The peak position search unit SR searches the generated correlation image data to find a peak position of a peak luminance (peak value) with a steepest rise and fall. That is, first, a value indicating the intensity of light, i.e., luminance, is input to the correlation image data. Also, the luminance is input in the form of a matrix.

In the correlation image data, the luminance is arranged at intervals of the pixel pitch (pixel size) of an area sensor. Thus, the search for the peak position is preferably performed after the so-called sub-pixel processing is performed. By performing the sub-pixel processing, the peak position may be searched with high accuracy. Thus, the detection unit may be able to accurately output the relative position, the amount of movement, and/or the moving speed of the web 120, for example.

Note that the search by the peak position search unit SR may be implemented in the following manner, for example.

Figure 6:
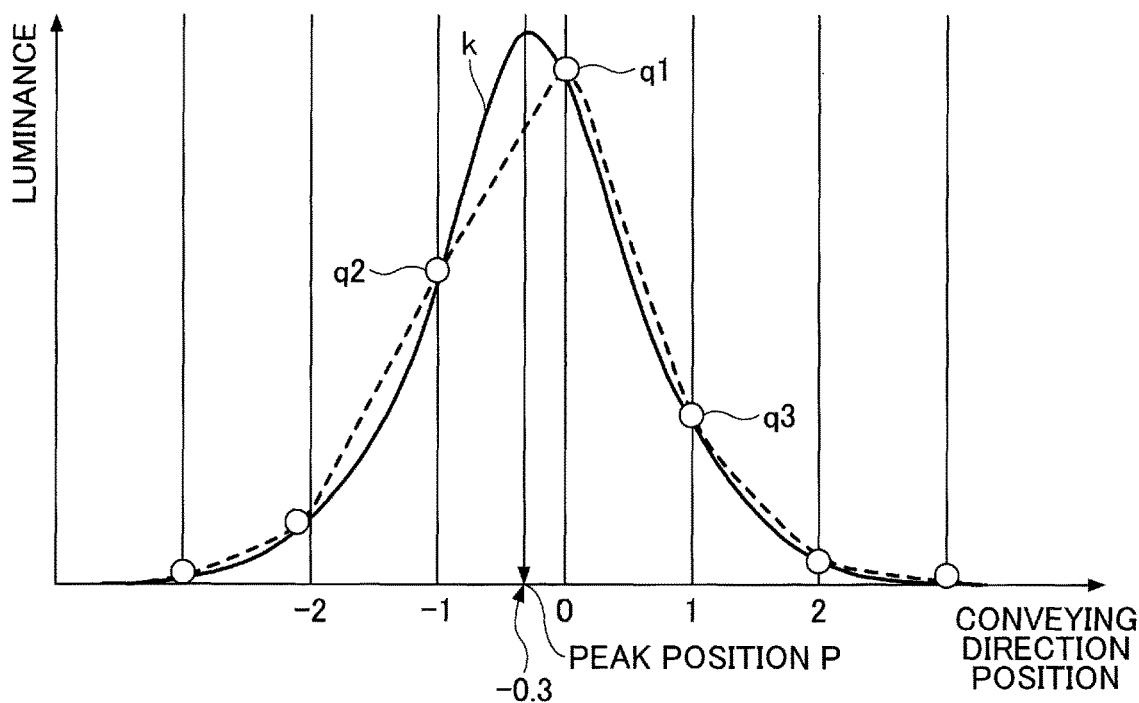
FIG. 6 is a diagram illustrating an example method of searching for a peak position in the correlation calculation according to an embodiment of the present invention.

FIG. 6 is a diagram illustrating an example peak position search method that may be implemented in the correlation calculation according to an embodiment of the present invention. In the graph of FIG. 6, the horizontal axis indicates a position in the conveying direction of an image represented by the correlation image data. The vertical axis indicates the luminance of the image represented by the correlation image data.

In the following, an example using three data values, i.e., first data value q1, second data value q2, and third data value q3, of the luminance values indicated by the correlation image data will be described. That is, in this example, the peak position search unit SR (FIG. 5) searches for a peak position P on a curve k connecting the first data value q1, the second data value q2, and the third data value q3.

Figure 20:
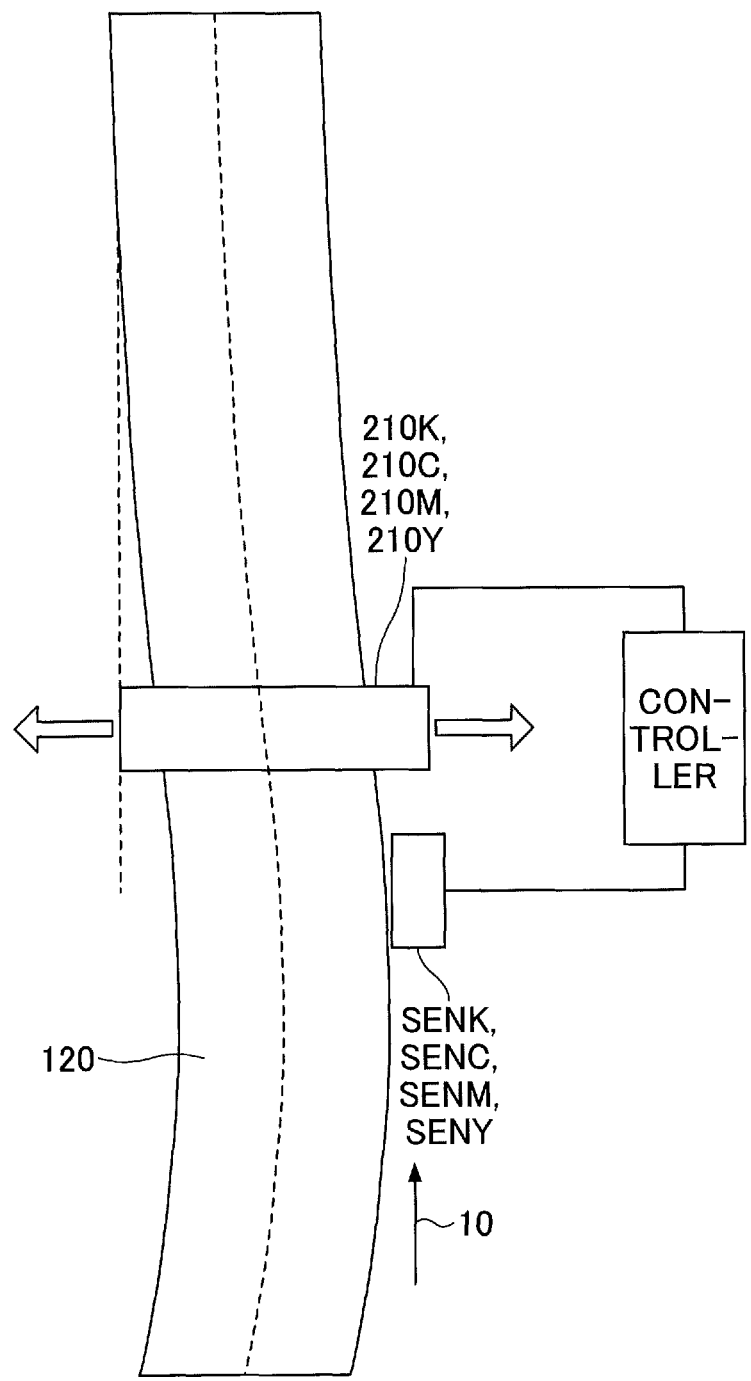
FIG. 20 is a diagram illustrating an example hardware configuration of a liquid ejection apparatus according to a first comparative example.

First, the peak position search unit SR calculates differences in luminance of the image represented by the correlation image data. Then, the peak position search unit SR extracts a combination of data values having the largest difference value from among the calculated differences. Then, the peak position search unit SR extracts combinations of data values that are adjacent to the combination of data values with the largest difference value. In this way, the peak position search unit SR can extract three data values, such as the first data value q1, the second data value q2, and the third data value q3, as illustrated in FIG. 20. Then, by obtaining the curve k by connecting the three extracted data values, the peak position search unit SR may be able to search for the peak position P. In this way, the peak position search unit SR may be able to reduce the calculation load for operations such as sub-pixel processing and search for the peak position P at higher speed, for example. Note that the position of the combination of data values with the largest difference value corresponds to the steepest position. Also, note that sub-pixel processing may be implemented by a process other than the above-described process.

When the peak position search unit SR searches for a peak position in the manner described above, the following calculation result may be obtained, for example.

Figure 7:
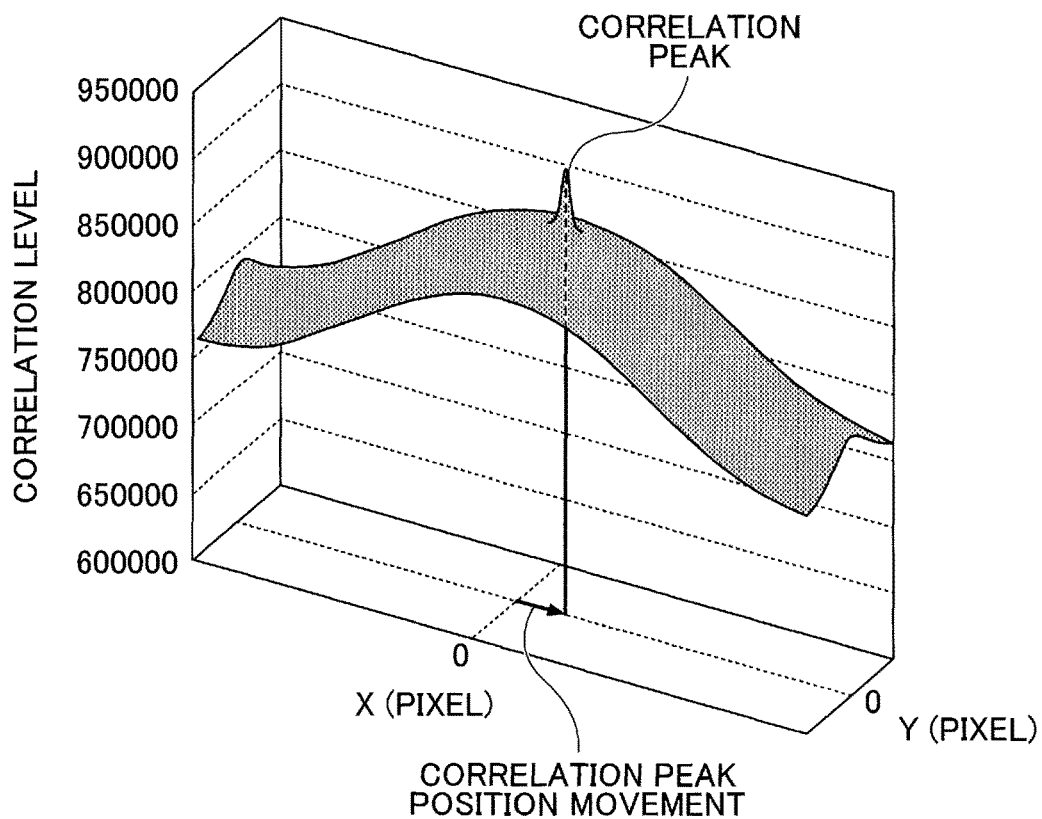
FIG. 7 is a diagram illustrating an example calculation result of implementing the correlation calculation according to an embodiment of the present invention.

FIG. 7 is a diagram illustrating an example calculation result of the correlation calculation according to an embodiment of the present invention. FIG. 7 indicates a correlation level distribution of a cross-correlation function. In FIG. 7, the X-axis and the Y-axis indicate serial numbers of pixels. The peak position search unit SR (FIG. 5) searches the correlation image data to find a peak position, such as "correlation peak" as illustrated in FIG. 7, for example.

Referring back to FIG. 5, the calculating unit CAL may calculate the relative position, the amount of movement, and/or the moving speed of the web 120, for example. Specifically, for example, the calculating unit CAL may calculate the relative position and the amount of movement of the web 120 by calculating the difference between a center position of the correlation image data and the peak position identified by the peak position search unit SR.

Also, based on the relative position, the calculating unit CAL may calculate the moving speed of the web 120 using the following equation (1), for example.

$$V = [\{(K+J) \times L\}/\sqrt{i}]/T \qquad (1)$$

In the above equation (1), V represents the moving speed. T represents the imaging cycle at which an image is captured. Also, K represents the relative pixel number. Further, L represents the pixel pitch, and J represents the relative position. Also, i represents the magnification of the area sensor.

As described above, by performing the correlation calculation, the detection unit may be able to detect the relative position, the amount of movement, and/or the moving speed of the web 120, for example. Note, however, that the method of detecting the relative position, the amount of movement, and the moving speed is not limited to the above-described method. For example, the detection unit may also detect the relative position, the amount of movement, and/or the moving speed in the manner as described below.

First, the detection unit binarizes the first image data and the second image data based on their luminance. In other words, the detection unit sets a luminance to "0" if the luminance is less than or equal to a preset threshold value, and sets a luminance to "1" if the luminance is greater than the threshold value. By comparing the binarized first image data and binarized second image data, the detection unit may detect the relative position, for example.

Note that the detection unit may detect the relative position, the amount of movement, and/or the moving speed using other detection methods as well. For example, the detection unit may detect the relative position based on patterns captured in two or more sets of image data using a so-called pattern matching process or the like.

Figure 8:
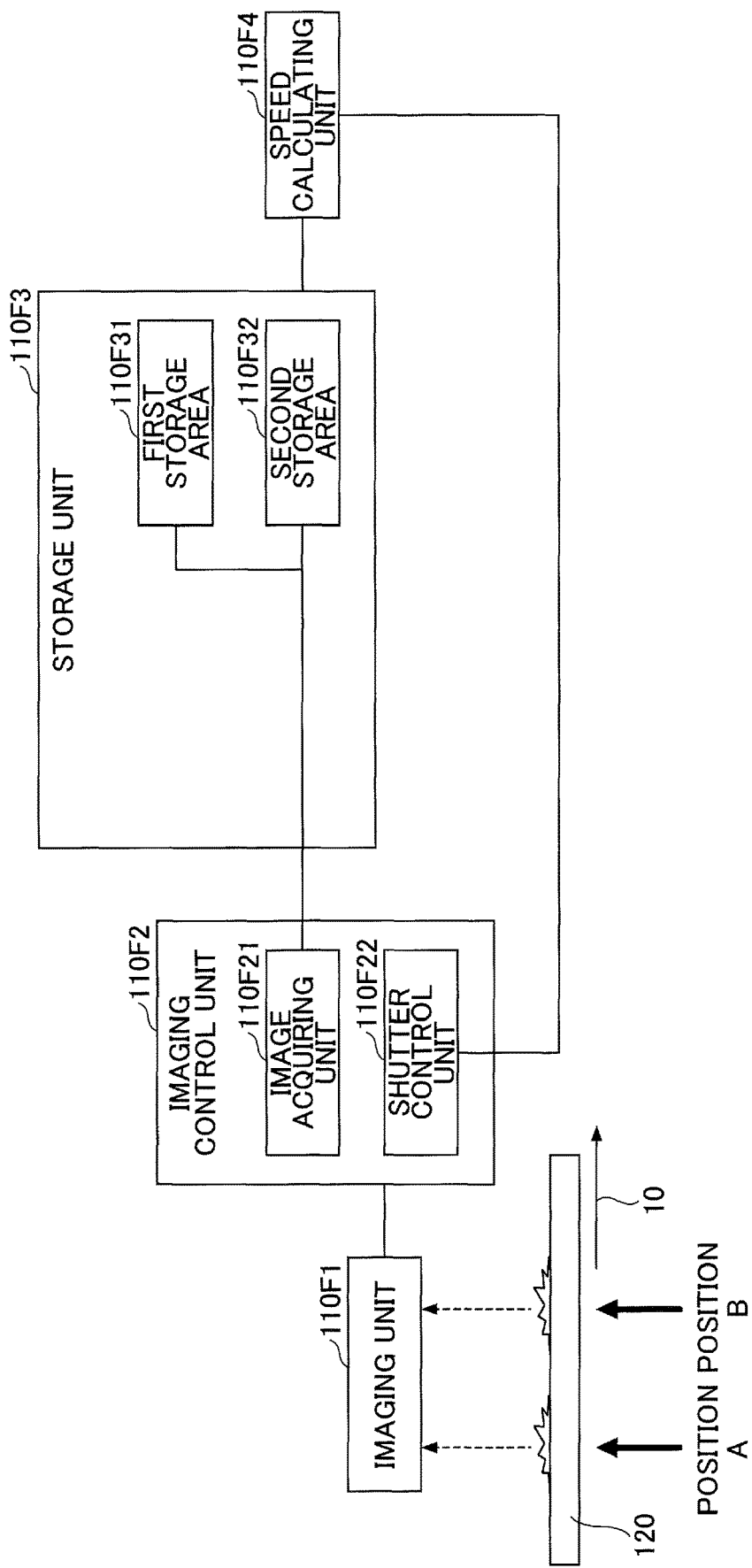
FIG. 8 is a block diagram illustrating an example functional configuration of the detection unit according to an embodiment of the present invention.

FIG. 8 is a block diagram illustrating an example functional configuration of the detection unit according to an embodiment of the present invention. In FIG. 8, the detection unit includes an imaging unit 110F1, an imaging control unit 110F2, a storage unit 110F3, and a speed calculating unit 110F4.

In the following, an example case is described where an imaging process is performed two times by the imaging unit 110F1, i.e., a case where two images are generated by the imaging unit 110F1. Also, in the following descriptions, the position at which the first imaging process is performed on the web 120 is referred to as "position A". Further, it is assumed that the second imaging process on the web 120 is performed at the time a pattern captured in the image obtained at "position A" in the first imaging process is moved to "position B" as a result of the web 120 being conveyed in the conveying direction 10.

As illustrated in FIG. 8, the imaging unit 110F1 captures an image of a conveyed object such as the web 120 that is conveyed in the conveying direction 10.

The imaging control unit 110F2 includes an image acquiring unit 110F21 and a shutter control unit 110F22.

The image acquiring unit 110F21 acquires an image captured by the imaging unit 110F1.

The shutter control unit 110F22 controls the timing at which the imaging unit 110F1 captures an image.

The storage unit 110F3 includes a first storage area 110F31 and a second storage area 110F32.

An image captured when the pattern of the web 120 is located at "position A" and an image captured when the pattern is located at "position B" are respectively stored in the first storage area 110F31 and the second storage area 110F32.

The speed calculating unit 110F4 is capable of obtaining the position of the imaged pattern of the web 120, the moving speed of the web 120 being conveyed, and the amount of movement of the web 120 being conveyed, based on the images stored in the first storage area 110F31 and the second storage area 110F32. For example, the speed calculating unit 110F4 may output to the shutter control unit 110F22, data such as a time difference Δt indicating the timing for releasing a shutter. That is, the speed calculating unit 110F4 may output a trigger signal to the shutter control unit 110F22 so that the image representing "position A" and the image representing "position B" may be captured at different timings having the time difference of Δt, for example. Then, the speed calculating unit 110F4 may control a motor or the like that is used to convey the web 120 so as to achieve the calculated moving speed.

The web 120 is a member having scattering properties on its surface or in its interior, for example. Thus, when laser light is irradiated on the web 120, the laser light is diffusely reflected by the web 120. By this diffuse reflection, a pattern is formed on the web 120. The pattern may be a so-called speckle pattern including speckles (spots), for example. Thus, when the web 120 is imaged, an image representing a speckle pattern may be obtained. Because the position of the speckle pattern can be determined based on the obtained image, the detection unit may be able to detect where a predetermined position of the web 120 is located. Note that the speckle pattern is generated by the interference of irradiated laser beams caused by a roughness of the surface or the interior of the web 120, for example.

Also, the light source is not limited to an apparatus using laser light. For example, the light source may be an LED (Light Emitting Diode) or an organic EL (Electro-Luminescence) element. Also, depending on the type of light source used, the pattern formed on the web 120 may not be a speckle pattern. In the example described below, it is assumed that the pattern is a speckle pattern.

When the web 120 is conveyed, the speckle pattern of the web 120 is also conveyed. Therefore, the amount of movement of the web 120 may be obtained by detecting the same speckle pattern at different times. That is, by detecting the same speckle pattern multiple times to obtain the amount of movement of the speckle pattern, the speed calculating unit 110F4 may be able to obtain the amount of movement of the web 120. Further, the speed calculating unit 110F4 may be able to obtain the moving speed of the web 120 by converting the above obtained amount of movement into a distance per unit time, for example.

In this way, based on the speckle pattern, the image forming apparatus 110 may be able to obtain accurate detection results indicating the position of the web 120 in the orthogonal direction, for example.

Note that the detection unit may be configured to detect the position of the web 120 in the conveying direction, for example. That is, the detection unit may be used to detect a position in the conveying direction as well as a position in the orthogonal direction. By configuring the detection unit to detect positions in both the conveying direction and the orthogonal direction as described above, the cost of installing a device for performing position detection may be reduced. In addition, because the number of devices can be reduced, space conservation may be achieved, for example.

Referring back to FIG. 2, in the following descriptions, a sensor installed for the black liquid ejection head unit 210K is referred to as "black sensor SENK". Similarly, a sensor installed for the cyan liquid ejection head unit 210C is referred to as a "cyan sensor SENC". Also, a sensor installed for the magenta liquid ejection head unit 210M is referred to as "magenta sensor SENM". Further, a sensor installed for the yellow liquid ejection head unit 210Y is referred to as "yellow sensor SENY".

Note that in the example of FIG. 2, the black sensor SENK, the cyan sensor SENC, the magenta sensor SENM, and the yellow sensor SENY correspond to examples of the first sensor (first detection unit). Also, the sensor SEN2 arranged upstream of the above first sensors corresponds to an example of the second sensor (second detection unit).

In the following descriptions, "sensor installation position" refers to a position where detection is performed. In other words, not all the elements of the detection unit have to be installed at each "sensor installation position". For example, elements other than a sensor may be connected by a cable and installed at some other position. Note that in FIG. 2, the black sensor SENK, the cyan sensor SENC, the magenta sensor SENM, and the yellow sensor SENY are installed at their corresponding sensor installation positions.

As illustrated, the installation positions of the first sensors for the liquid ejection head units are preferably located relatively close to the corresponding landing positions of the liquid ejection head units. By arranging the first sensor close to each landing position, the distance between each landing position and the first sensor may be reduced. By reducing the distance between each landing position and the first sensor, detection errors may be reduced. In this way, the image forming apparatus 110 may be able to accurately detect a position of a recording medium, such as the web 120, in the orthogonal direction using the first sensors.

Specifically, the sensor installation position close to the landing position may be located between the first roller and the second roller of each liquid ejection heat unit. That is, in the example of FIG. 2, the installation position of the black sensor SENK is preferably somewhere within range INTK1 between the first roller CR1K and the second roller CRK2. Similarly, the installation position of the cyan sensor SENC is preferably somewhere within range INTC1 between the first roller CR1C and the second roller CR2C. Also, the installation position of the magenta sensor SENM is preferably somewhere within range INTM1 between the first roller CR1M and the second roller CR2M. Further, the installation position of the yellow sensor SENY is preferably somewhere within range INTY1 between the first roller CR1Y and the second roller CY2Y.

By installing a sensor between each pair of rollers as described above, the sensor may be able to detect the position of a recording medium at a position close to the landing position of each liquid ejection head unit. Note the moving speed of a conveyed object (e.g., recording medium) tends to be relatively stable between the pair of rollers. Thus, the image forming apparatus 110 may be able to accurately detect the position of a conveyed object such as a recording medium in the orthogonal direction.

Moreover, the installation position of the first sensor is preferably located toward the first roller with respect to the landing position between the pair of rollers. That is, as illustrated in FIG. 2, the installation position of the first sensor is preferably located upstream of the landing position of each liquid ejection head unit.

Specifically, the installation position of the black sensor SENK is preferably located upstream of the black landing position PK, between the black landing position PK and the installation position of the first roller CR1K (hereinafter referred to as "black upstream section INTK2"). Similarly, the installation position of the cyan sensor SENC is preferably located upstream of the cyan landing position PC, between the cyan landing position PC and the installation position of the first roller CR1C (hereinafter referred to as "cyan upstream section INTC2"). Also, the installation position of the magenta sensor SENM is preferably located upstream of the magenta landing position PM, between the magenta landing position PM and the installation position of the first roller CR1M (hereinafter referred to as "magenta upstream section INTM2"). Further, the installation position of the yellow sensor SENY is preferably located upstream of the yellow landing position PY, between the yellow landing position PY and the installation position of the first roller CR1Y (hereinafter referred to as "yellow upstream section INTY2").

By installing the first sensors within the black upstream section INTK2, the cyan upstream section INTC2, the magenta upstream section INTM2, and the yellow upstream section INTY2, the image forming apparatus 110 may be able to accurately detect a position of a recording medium in the orthogonal direction. Further, by installing the first sensors within the above sections, the first sensors may be positioned upstream of the landing positions. In this way, the image forming apparatus 110 may be able to accurately detect a position of a recording medium in the orthogonal direction using the first sensor installed at the upstream side of the landing position of each liquid ejection head unit and calculate the ejection timing of each liquid ejection head unit. That is, for example, while performing the above calculation, the web 120 may be conveyed toward the downstream side and each liquid ejection head unit may eject ink at the calculated timing.

Note that when the sensor installation position is located directly below each liquid ejection head unit, a color shift may occur due to a delay in control operations, for example. Thus, by arranging the installation position of the first sensor to be at the upstream side of the landing position of each liquid ejection head unit, the image forming apparatus 110 may be able to reduce color shifts and improve image quality, for example. Also, note that in some cases, the installation position of the first sensor may be restricted from being too close to the landing position, for example. Thus, in some embodiments the installation position of the first sensor may be located toward the first roller with respect to the landing position of each liquid ejection head unit, for example.

Also, in some embodiments, the installation position of the first sensor may be arranged directly below each liquid ejection head unit (directly below the landing position of each liquid ejection head unit), for example. In the following, an example case where the first sensor is installed directly below each liquid ejection head unit is described. By installing the first sensor directly below each liquid ejection head unit, the first senor may be able to accurately detect an amount of movement directly below its installation position. Thus, if control operations can be promptly performed, the first sensor is preferably located closer to a position directly below each liquid ejection head unit. Note, however, that the installation position of the first sensor is not limited to a position directly below each liquid ejection head unit, and even in such case, calculation operations similar to those described below may be implemented.

Also, in some embodiments, if errors can be tolerated, the installation position of the first sensor may be located directly below each liquid ejection head unit or at a position further downstream between the first roller and the second roller, for example.

Note that in a case where the first sensors are arranged at substantially the same distances from each other, the second sensor may also be arranged at substantially the same distance from the closest first sensor. Specifically, with respect to the example of FIG. 2, the first sensors may be arranged such that the distance between the black sensor SENK and the cyan sensor SENC, the distance between the cyan sensor SENC and the magenta sensor SENM, and the distance between the magenta sensor SENM and the yellow sensor SENY are substantially the same, for example. In such case the second sensor SEN2 is preferably arranged such that the distance between the second sensor SEN2 and the black sensor SENK may be substantially the same as the distance between the black sensor SENK and the cyan sensor SENC. Note that the detection accuracy of the sensors is often calculated based on the distance between the sensors. Thus, by arranging the distance between the sensors to be substantially the same, the detection accuracy of the sensors may be substantially uniform, for example.

Also, the installation position of the second sensor is preferably located downstream of a roller around which the web may be wound. That is, when the web is wound around a roller, the web is prone to positional variations, for example. Thus, the second sensor is preferably arranged to detect a position of the web after the web passes such roller, i.e., at a downstream side of the roller. In this way, a detection result obtained by the second sensor may be less susceptible to influences of positional variations of the web due to the web being wound around the roller, for example. Note that in the example of FIG. 2, the web 120 is prone to be wound around the roller 230 to form a relatively acute angle with respect to the roller 230 such that the web 120 may be susceptible to positional variations at the roller 230. Thus, in the example of FIG. 2, the second sensor SEN2 is preferably arranged downstream of the roller 230.

Also, the image forming apparatus 110 may further include a measuring unit such as an encoder. In the following, an example where the measuring unit is implemented by an encoder will be described. More specifically, the encoder may be installed with respect to a rotational axis of the roller 230, for example. In this way, the amount of movement of the web 120 in the conveying direction may be measured based on the amount of rotation of the roller 230, for example. By using the measurement result obtained by the encoder together with the detection result obtained by the sensors, the image forming apparatus 110 may be able to more accurately eject liquid onto the web 120, for example.

FIGS. 9A and 9B are diagrams illustrating an example case where variations occur in the position of a recording medium in the orthogonal direction. Specifically, an example case is described where the web 120 is conveyed in the conveying direction 10 as illustrated in FIG. 9A. As illustrated in this example, the web 120 is conveyed by rollers and the like. When the web 120 is conveyed in this manner, variations may occur in the position of the web 120 in the orthogonal direction as illustrated in FIG. 9B, for example. That is, the web 120 may "meander" side to side in the orthogonal direction as illustrated in FIG. 9B.

In the illustrated example, the variations in the position of the web 120 occur as a result of the slanting of the rollers (see FIG. 9A). Note that although FIG. 9A illustrates a state where one of the rollers is conspicuously slanted for the sake of facilitating understanding, the slanting of the roller may be less conspicuous than the illustrated example.

Variations in the position of the web 120 in the orthogonal direction, i.e., "meandering", may occur as a result of eccentricity/misalignment of the conveying rollers or from cutting the web 120 with a blade, for example. Also, the "meandering" of the web 120 as illustrated in FIG. 9B may be caused by the physical shape of the web 120, such as when the web 120 is not uniformly cut by the blade, for example.

Figure 10:
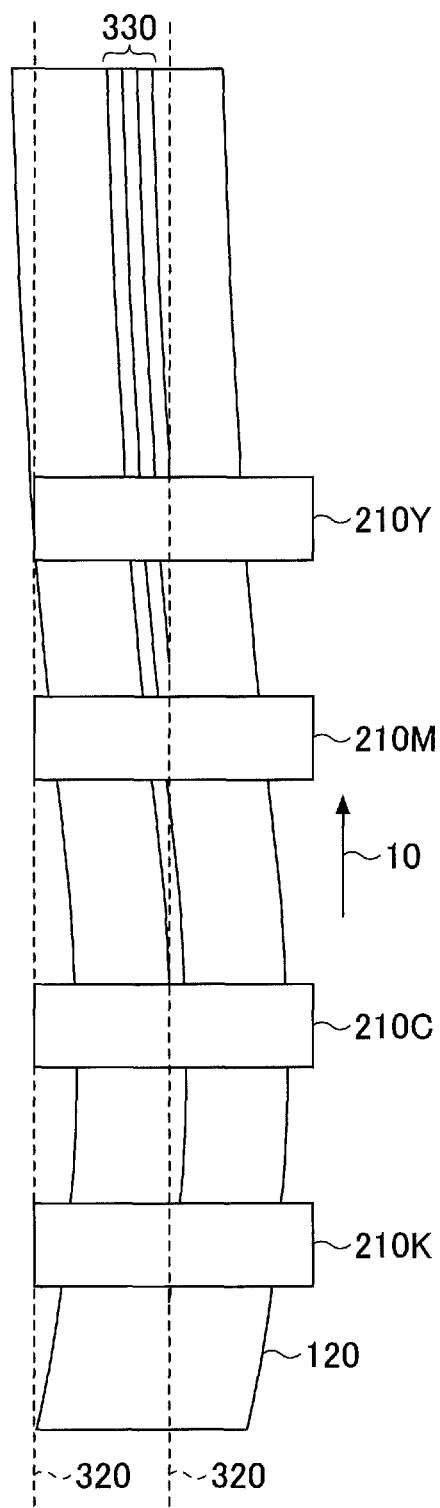
FIG. 10 is a diagram illustrating an example cause of a color shift.

FIG. 10 is a diagram illustrating an example cause of a color shift. As described above with reference to FIGS. 9A and 9B, when variations occur in the position of the recording medium in the orthogonal direction, i.e., when "meandering" occurs, a color shift is more likely to occur in the manner illustrated in FIG. 10, for example.

Specifically, when forming an image on a recording medium using a plurality of colors, i.e., when forming a color image, the image forming apparatus 110 forms a so-called color plane on the web 120 by superimposing inks in the different colors that are ejected from the liquid ejection head units.

However, variations may occur in the position of the web 120 in the orthogonal direction as illustrated in FIGS. 9A and 9B. For example, "meandering" of the web 120 may occur with respect to a reference line 320 as illustrated in FIG. 10. In such case, when the liquid ejection head units for the different colors eject ink at the same position with respect to the orthogonal direction, the inks ejected on the web 120 may be shifted from each other to create a color shift 330 due to the "meandering" of the web 120 in the orthogonal direction. That is, the color shift 330 occurs as a result of lines formed by the inks ejected by the liquid ejection head units being shifted with respect to one another in the orthogonal direction. As described above, when the color shift 330 occurs, the image quality of the image formed on the web 120 may be degraded.

<Control Unit>

The controller 520 of FIG. 2, as an example of a control unit, may have a configuration as described below, for example.

Figure 11:
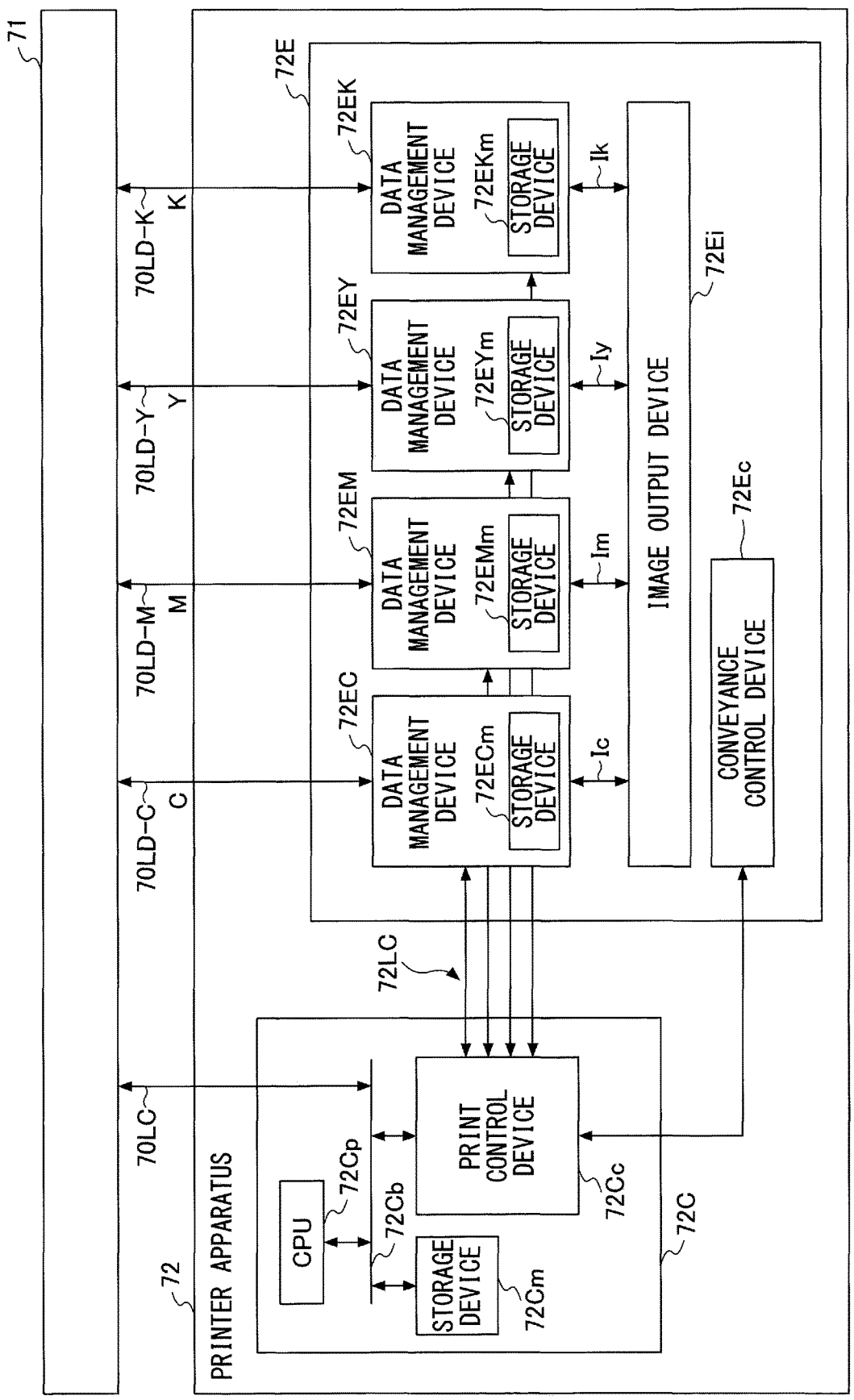
FIG. 11 is a block diagram illustrating an example hardware configuration of a control unit according to an embodiment of the present invention.

FIG. 11 is a block diagram illustrating an example hardware configuration of a control unit according to an embodiment of the present invention. For example, the controller 520 illustrated in FIG. 11 includes a host apparatus 71, which may be an information processing apparatus, and a printer apparatus 72. In the illustrated example, the controller 520 causes the printer apparatus 72 to form an image on a recording medium based on image data and control data input by the host apparatus 71.

The host apparatus 71 may be a PC (Personal Computer), for example. The printer apparatus 72 includes a printer controller 72C and a printer engine 72E.

The printer controller 72C controls the operation of the printer engine 72E. The printer controller 72C transmits/receives control data to/from the host apparatus 71 via a control line 70LC. Also, the printer controller 72C transmits/receives control data to/from the printer engine 72E via a control line 72LC. When various printing conditions indicated by the control data are input to the printer controller 72C by such transmission/reception of control data, the printer controller 72C stores the printing conditions using a register, for example. Then, the printer controller 72C controls the printer engine 72E based on the control data and forms an image based on print job data, i.e., the control data.

The printer controller 72C includes a CPU (Central Processing Unit) 72Cp, a print control device 72Cc, and a storage device 72Cm. The CPU 72Cp and the print control device 72Cc are connected by a bus 72Cb to communicate with each other. Also, the bus 72Cb may be connected to the control line 70LC via a communication I/F (interface), for example.

The CPU 72Cp controls the overall operation of the printer apparatus 72 based on a control program, for example. That is, the CPU 72Cp may implement functions of a calculating device and a control device.

The print control device 72Cc transmits/receives data indicating a command or a status, for example, to/from the printer engine 72E based on the control data from the host apparatus 71. In this way, the print control device 72Cc controls the printer engine 72E. Note that the storage unit 110F3 of the detection unit as illustrated in FIG. 8 may be implemented by the storage device 72Cm, for example. Also, the speed calculating unit 110F4 may be implemented by the CPU 72Cp, for example. However, the storage unit 110F3 and the speed calculating unit 110F4 may also be implemented by some other calculating device and storage device.

The printer engine 72E is connected to a plurality of data lines 70LD-C, 70LD-M, 70LD-Y, and 70LD-K. The printer engine 72E receives image data from the host apparatus 71 via the plurality of data lines. Then, the printer engine 72E forms an image in each color under control by the printer controller 72C.

The printer engine 72E includes a plurality of data management devices 72EC, 72EM, 72EY, and 72EK. Also, the printer engine 72E includes an image output device 72Ei and a conveyance control device 72Ec.

Figure 12:
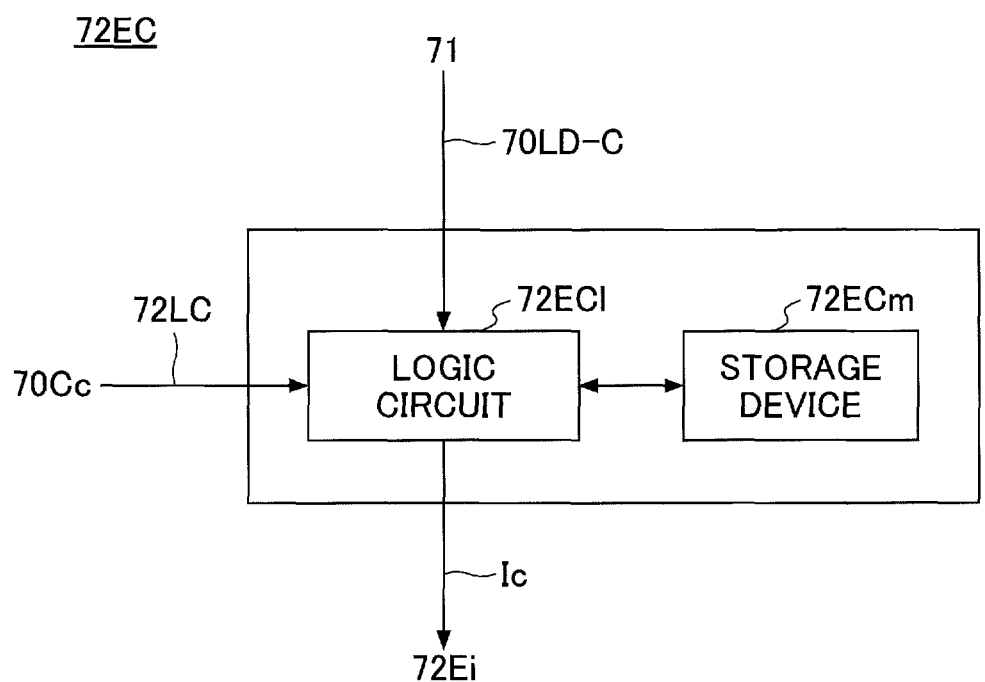
FIG. 12 is a block diagram illustrating an example hardware configuration of a data management device included in the control unit according to an embodiment of the present invention.

FIG. 12 is a block diagram illustrating an example hardware configuration of the data management device of the control unit according to an embodiment of the present invention. For example, the plurality of data management devices 72EC, 72EM, 72EY, and 72EK may have the same configuration. In the following, it is assumed that the data management devices 72EC, 72EM, 72EY, and 72EK have the same configuration, and the configuration of the data management apparatus 72EC is described as an example. Thus, overlapping descriptions will be omitted.

The data management device 72EC includes a logic circuit 72EC1 and a storage device 72ECm. As illustrated in FIG. 12, the logic circuit 72EC1 is connected to the host apparatus 71 via a data line 70LD-C. Also, the logic circuit 72EC1 is connected to the print control device 72Cc via the control line 72LC. Note that the logic circuit 72EC1 may be implemented by an ASIC (Application Specific Integrated Circuit) or a PLD (Programmable Logic Device), for example.

Based on a control signal input from the printer controller 72C (FIG. 11), the logic circuit 72EC1 stores image data input by the host apparatus 71 in the storage device 72ECm.

Also, the logic circuit 72EC1 reads cyan image data Ic from the storage device 72ECm based on the control signal input from the printer controller 72C. Then, the logic circuit 72EC1 sends the read cyan image data Ic to the image output device 72Ei.

Note that the storage device 72ECm preferably has a storage capacity for storing image data of about three pages or more, for example. By configuring the storage device 72ECm to have a storage capacity for storing image data of about three pages or more, the storage device 72ECm may be able to store image data input by the host apparatus 71, image data of an image being formed, and image data for forming a next image, for example.

Figure 13:
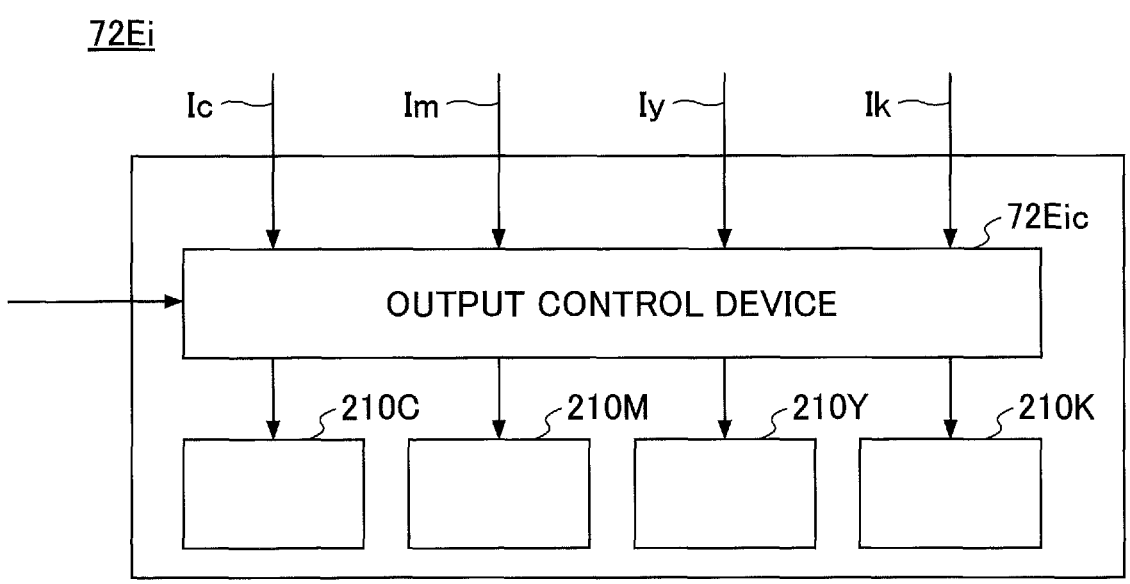
FIG. 13 is a block diagram illustrating an example hardware configuration of an image output device included in the control unit according to an embodiment of the present invention.

FIG. 13 is a block diagram illustrating an example hardware configuration of the. image output device 72Ei included in the control unit according to an embodiment of the present invention. As illustrated in FIG. 13, the image output device 72Ei includes an output control device 72Eic and the plurality of liquid ejection head units, including the black liquid ejection head unit 210K, the cyan liquid ejection head unit 210C, the magenta liquid ejection head unit 210M, and the yellow liquid ejection head unit 210Y.

The output control device 72Eic outputs image data of each color to the corresponding liquid ejection head unit for the corresponding color. That is, the output control device 72Eic controls the liquid ejection head units for the different colors based on image data input thereto.

Note that the output control device 72Eic may control the plurality of liquid ejection head units simultaneously or individually. That is, for example, upon receiving a timing input, the output control device 72Eic may perform timing control for changing the ejection timing of liquid to be ejected by each liquid ejection head unit. Note that the output control device 72Eic may control one or more of the liquid ejection head units based on a control signal input by the printer controller 72C (FIG. 11), for example. Also, the output control device 72Eic may control one or more of the liquid ejection head units based on an operation input by a user, for example.

Note that the printer apparatus 72 illustrated in FIG. 11 is an example printer apparatus having two distinct paths including one path for inputting image data from the host apparatus 71 and another path used for transmission/reception of data between the host apparatus 71 and the printer apparatus 72 based on control data.

Also, note that the printer apparatus 72 may be configured to form an image using one color, such as black, for example. In the case where the printer apparatus 72 is configured to form an image with only black, for example, the printer engine 72E may include one data management device and four black liquid ejection head units in order to increase image forming speed, for example.

The conveyance control device 72Ec (FIG. 11) may include a motor, a mechanism, and a driver device for conveying the web 120. For example, the conveyance control device 72Ec may control a motor connected to each roller to convey the web 120.

<Overall Process>

Figure 14:
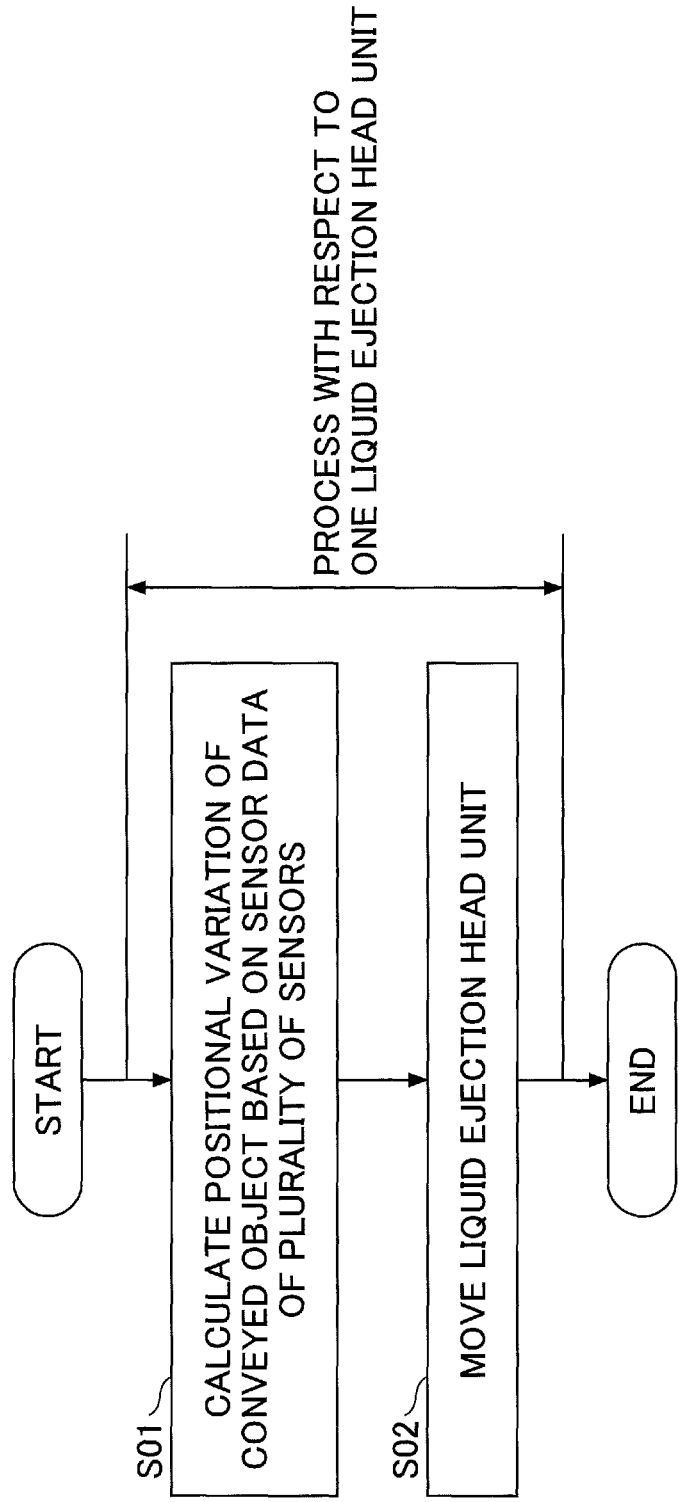
FIG. 14 is a flowchart illustrating an example overall process implemented by the liquid ejection apparatus according to an embodiment of the present invention.

FIG. 14 is a flowchart illustrating an example overall process implemented by the liquid ejection apparatus according to an embodiment of the present invention. For example, in the process described below, it is assumed that image data representing an image to be formed on the web 120 (FIG. 1) is input to the image forming apparatus 110 in advance. Then, based on the input image data, the image forming apparatus 110 may perform the process as illustrated in FIG. 14 to form the image represented by the image data on the web 120.

Note that FIG. 14 illustrates a process that is implemented for one liquid ejection head unit. For example, the process of FIG. 14 may represent a process implemented with respect to the black liquid ejection head unit 210K of FIG. 2. The process of FIG. 14 may be separately implemented for the other liquid ejection head units for the other colors in parallel or before/after the process of FIG. 14 that is implemented with respect to the black liquid ejection head unit 210K.

In step S01, the image forming apparatus 110 calculates an amount of positional variation of a recording medium based on a plurality of sets of sensor data. That is, in step S01, the image forming apparatus 110 detects a position of a recording medium in the orthogonal direction using each of the plurality of sensors. Then, the image forming apparatus 110 acquires sensor data indicating a detection result output by each of the plurality of sensors. Then, the image forming apparatus 110 calculates the amount of positional variation of the recording medium based on the plurality of detection results (sensor data) output by the plurality of sensors. Note that a calculation method used to calculate the amount of positional variation is described in detail below.

In step S02, the image forming apparatus 110 moves the liquid ejection head unit in the orthogonal direction that is orthogonal to the conveying direction of the recording medium. Note that the process of step S02 is implemented based on the detection results obtained in step S01. Further, in step S02, the liquid ejection head unit is moved to compensate for the variation in the position of the recording medium that is indicated by the detection results obtained in step S01. For example, in step S02, the image forming apparatus 110 may compensate for the positional variation of the web 120 by moving the liquid ejection head unit by an amount corresponding to the amount of positional variation of the web 120 in the orthogonal direction detected in step S01.

Figure 15:
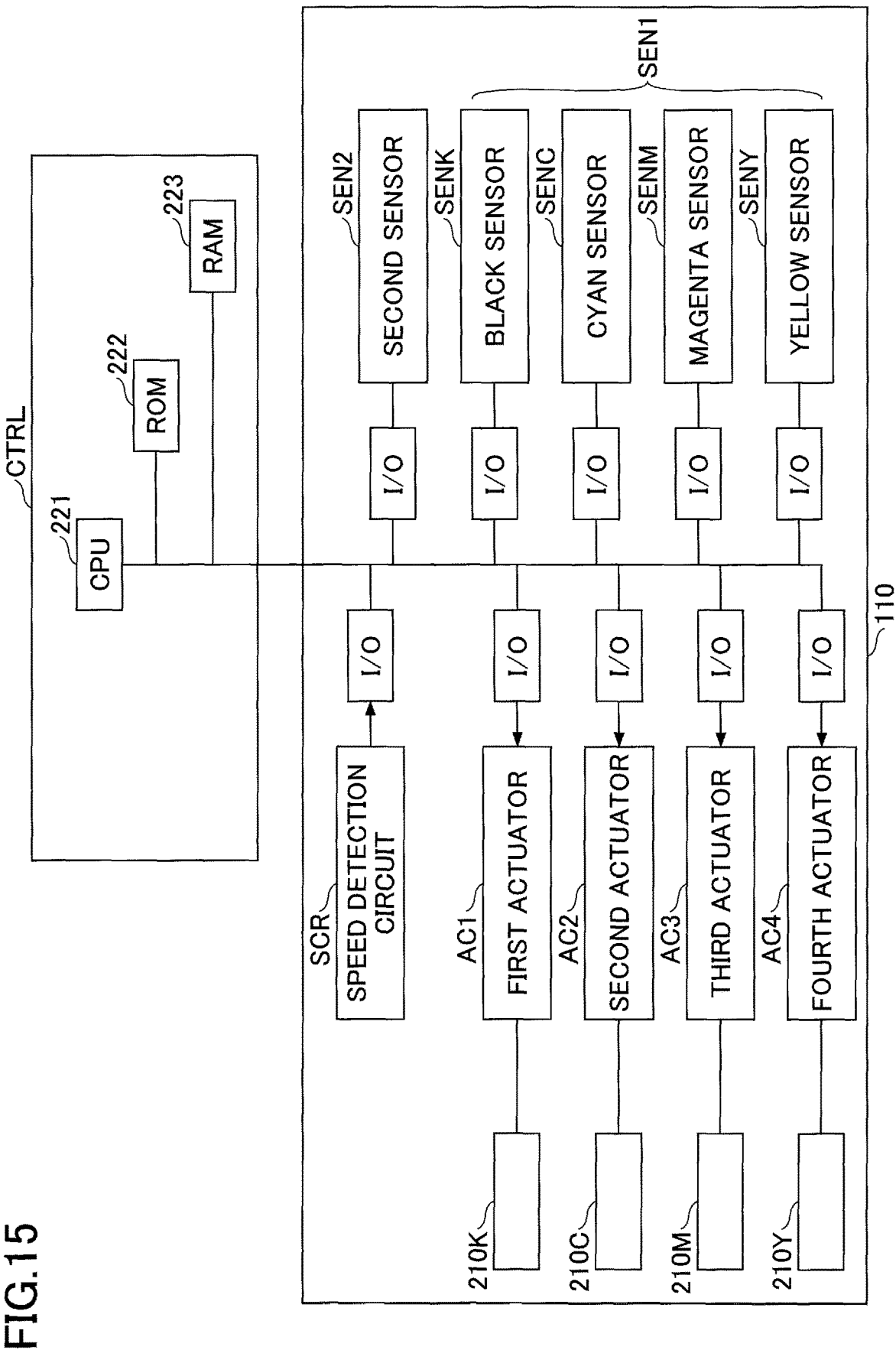
FIG. 15 is a block diagram illustrating an example hardware configuration for calculating an amount of positional variation according to an embodiment of the present invention.

FIG. 15 is a block diagram illustrating an example hardware configuration for moving the liquid ejection head units based on the amount of positional variation of a recording medium according to an embodiment of the present invention. In the illustrated example of FIG. 15, the image forming apparatus 110 includes a plurality of actuators AC1 to AC4 and the plurality of sensors SEN2, SENK, SENC, SENM, and SENY. Also, the image forming apparatus 110 includes a speed detection circuit SCR. Further, in FIG. 15, the image forming apparatus 110 is connected to a control device CTRL. The control device CTRL includes a CPU 221, a ROM (Read-Only Memory) 222, and a RAM (Random Access Memory) 223. Also, as illustrated in FIG. 15, the image forming apparatus 110 may include a plurality of I/O (input/output) interfaces for transmitting/receiving data to/from the plurality of actuators, sensors, and other devices.

Note that the above configuration is merely one example configuration for implementing the above-described process. That is, the devices illustrated in FIG. 15 may be included in the image forming apparatus 110 or provided as external devices, for example.

Also, the devices illustrated in FIG. 15 may be configured to implement functions of other devices. For example, the CPU 221 may also act as a CPU for implementing the detection unit, or a separate CPU may be provided for implementing the detection unit.

The CPU 221 is an example of a calculating device and a control device. Specifically, the CPU 221 acquires the detection results of the respective sensors and performs calculation operations for calculating the amount of positional variation of a conveyed object. Further, the CPU 221 controls the actuators to move the liquid ejection head units.

The ROM 222 and the RAM 223 are examples of storage devices. For example, the ROM 222 stores programs and data to be used by the CPU 221. Further, the RAM 223 acts as a storage area that stores a program used by the CPU 22 to perform calculation operations, for example.

The speed detection circuit SCR is an electronic circuit for detecting the moving speed of a conveyed object. For example, a "6-ppi (pixels per inch)" signal may be input to the speed detection circuit SCR. In turn, the speed detection circuit SCR may calculate the speed at which the conveyed object is conveyed based on the detection result from each sensor or a detection result from an encoder, for example, and transmit the calculated speed to the CPU 221. Note that the speed detection circuit SCR may be the same as or different from the FPGA of FIG. 4.

Each of the actuators AC1-AC4 is connected to the corresponding liquid ejection head unit that is to be moved by the actuator. Specifically, the first actuator AC1 is connected to the black liquid ejection head unit 210K. That is, the first actuator AC1 moves the black liquid ejection head unit 210K in the orthogonal direction. Similarly, the second actuator AC2 is connected to the cyan liquid ejection head unit 210C. That is, the second actuator AC2 moves the cyan liquid ejection head unit 210C in the orthogonal direction orthogonal to the conveying direction of the web. Further, the third actuator AC3 is connected to the magenta liquid ejection head unit 210M. That is, the third actuator AC3 moves the magenta liquid ejection head unit 210M in the orthogonal direction. Further, the fourth actuator AC4 is connected to the yellow liquid ejection head unit 210Y. That is, the fourth actuator AC4 moves the yellow liquid ejection head unit 210Y in the orthogonal direction.

Note that each of the actuators AC1-AC4 may move the corresponding liquid ejection head unit using the following moving mechanism, for example.

Figure 16:
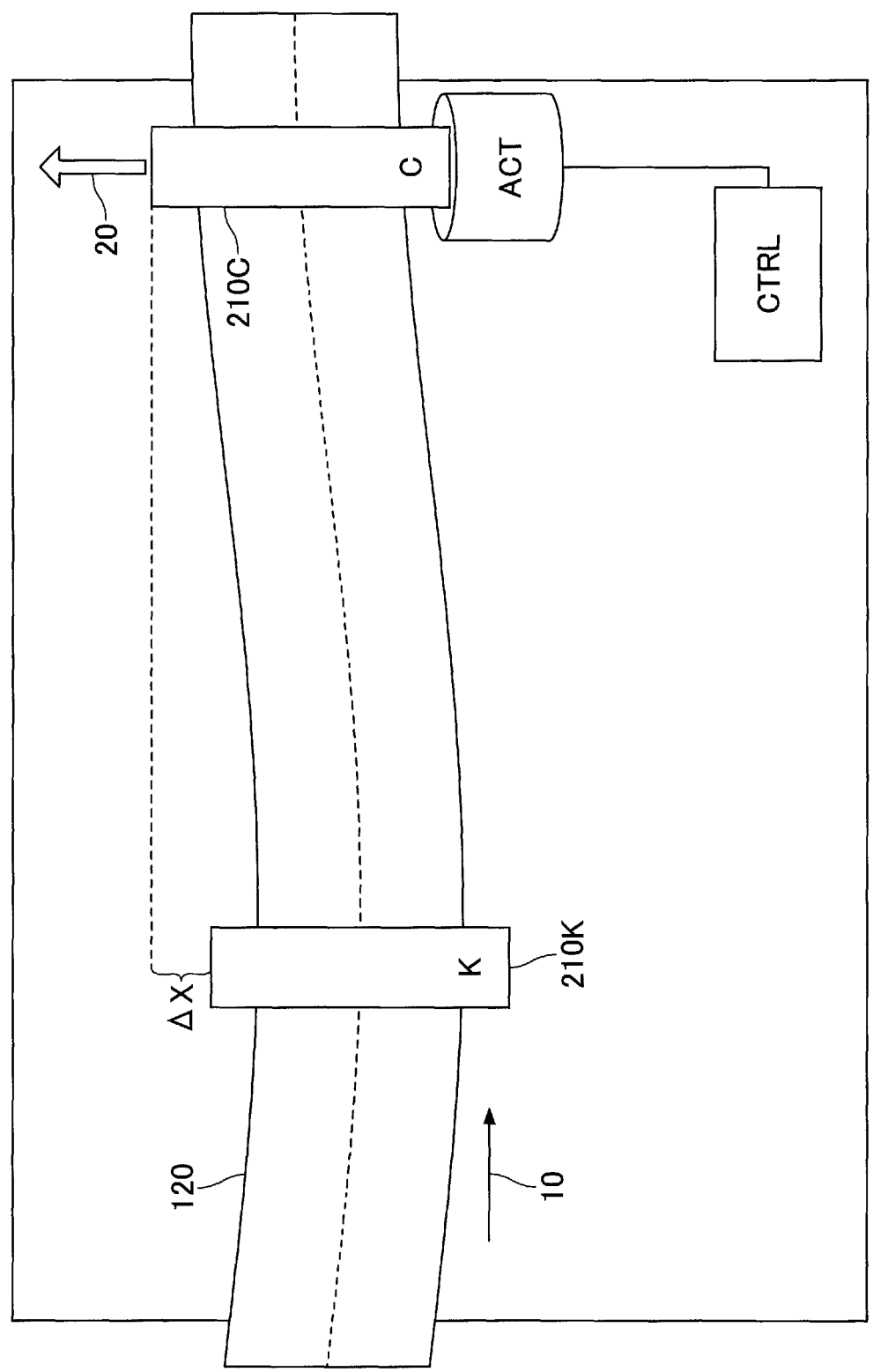
FIG. 16 is a diagram illustrating an example moving mechanism for moving a liquid ejection head unit of the liquid ejection apparatus according to an embodiment of the present invention.

FIG. 16 is a block diagram illustrating an example moving mechanism for moving a liquid ejection head unit of the liquid ejection apparatus according to an embodiment of the present invention. The moving mechanism may have a hardware configuration as illustrated in FIG. 16, for example. Note that the example hardware configuration illustrated in FIG. 16 is for moving the cyan liquid ejection head unit 210C.

In the illustrated example of FIG. 16, an actuator ACT such as a linear actuator for moving the cyan liquid ejection head unit 210C is installed in the cyan liquid ejection head unit 210C. Further, the controller CTL for controlling the actuator ACT is connected to the actuator ACT.

The actuator ACT may be a linear actuator or a motor, for example. Also, the actuator ACT may include a control circuit, a power supply circuit, and mechanical components, for example.

The controller CTL receives a detection result obtained in step S01 of FIG. 14 as an input. In turn, the controller CTL controls the actuator ACT to move the cyan liquid ejection head unit 210C to compensate for the variation in the position of the web 120 indicated by the detection result (step S02 of FIG. 12).

In the illustrated example of FIG. 13, the detection result input to the controller CTL may indicate a variation Δ, for example. Thus, in the present example, the controller CTL may control the actuator ACT to move the cyan liquid ejection head unit 210C in the orthogonal direction 20 to compensate for the variation Δ.

Note that the hardware configuration of the controller 520 illustrated in FIG. 12 and the hardware configuration for moving a liquid ejection head unit as illustrated in FIG. 13 may be integrated or they may be separate.

Referring back to FIG. 15, the control device CTRL receives the detection result output by each sensor. Specifically, the control device CTRL is connected to the second sensor SEN2. Also, the control device CTRL is connected to the first sensors SEN1. Note that in the illustrated example, the first sensors SEN1 include the black sensor SENK, the cyan sensor SENC, the magenta sensor SENM, and the yellow sensor SENY.

Figure 17:
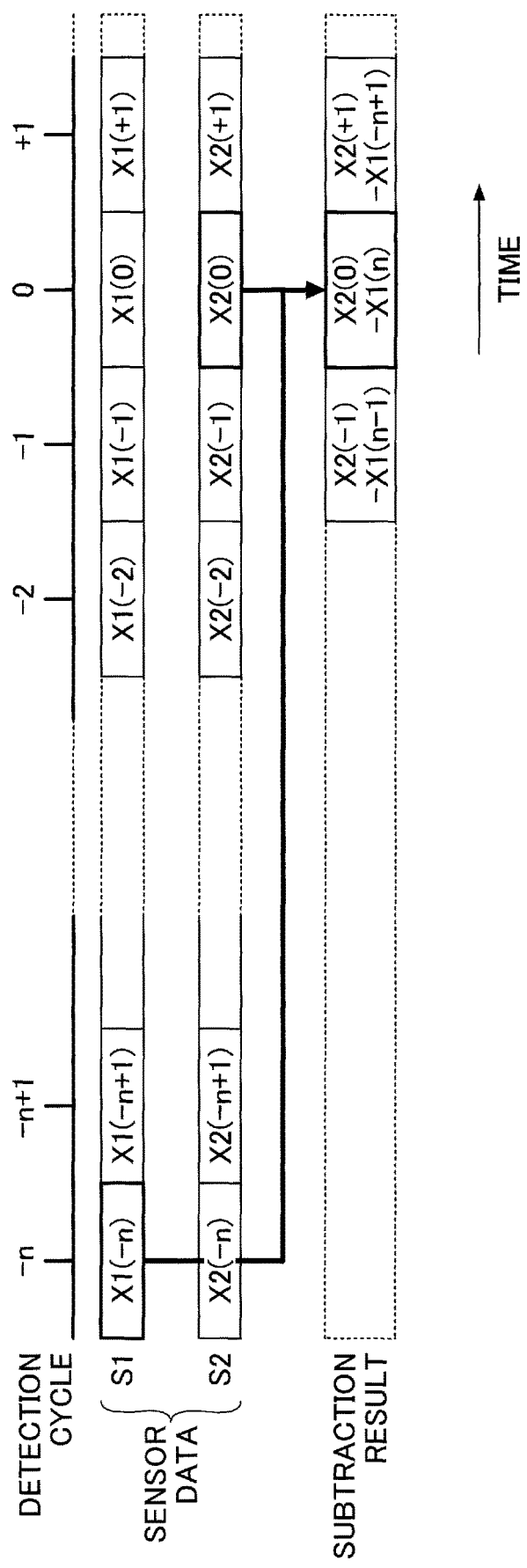
FIG. 17 is a timing chart illustrating an example method for calculating an amount of positional variation of a conveyed object that is implemented by the liquid ejection apparatus according to an embodiment of the present invention.

FIG. 17 is a timing chart illustrating an example method of calculating a variation in the position of a recording medium that may be implemented by the liquid ejection apparatus according to an embodiment of the present invention. As illustrated in FIG. 17, the control device CTRL (FIG. 15) calculates the amount of positional variation of a recording medium based on a plurality of detection results. Specifically, based on a first detection result S1 and a second detection result S2, the control device CTRL outputs a calculation result indicating an amount of positional variation of a recording medium. Note that the first detection result S1 and the second detection result S2 may be detection results indicated by sensor data output by any two sensors selected from the group consisting of the first sensors SEN1 and the second sensor SEN2 illustrated in FIG. 15, for example. The sensor data output by the sensors are transmitted to the control device CTRL and stored as detection results in the RAM 223. Thus, the control device CTRL calculates the amount of positional variation of the recording medium based on the plurality of detection results indicated by the stored sensor data.

Note that the amount of positional variation may be calculated with respect to each liquid ejection head unit. In the following, an example case of calculating the amount of positional variation for the cyan liquid ejection head unit 210C (FIG. 2) is described. In the present example, the amount of positional variation may be calculated based on a detection result output by the cyan sensor SENC (FIG. 2) and a detection result output by the black sensor SENK (FIG. 2), which is installed one place upstream (immediately upstream) of the cyan sensor SENC, for example. In FIG. 17, it is assumed that the first detection result S1 corresponds to the detection result output by the black sensor SENK and the second detection result S2 corresponds to the detection result output by the cyan sensor SENC.

Also, in the present example, assuming "L2" represents the distance between the black sensor SENK and the cyan sensor SENC, "V" represents the moving speed detected by the speed detection circuit SCR, and "T2" represents a moving time that is required for moving a conveyed object (e.g., recording medium) from the position of the black sensor SENK to the position of the cyan sensor SENC, the moving time may be calculated as follows.

$$T2 = L2/V$$

Also, assuming "A" represents a sampling period and "n" represents the sampling frequency of the black sensor SENK and the cyan sensor SENC, the sampling frequency "n" may be calculated as follows.

$$n = T2/A$$

Also, in the present example, it is assumed that the "ΔX" represents the calculation result, i.e., the amount of positional variation. For example, with respect to a detection cycle "0" as the current detection cycle, the amount of positional variation "ΔX" may be calculated by comparing the first detection result S1 that was obtained a time period of "T2" earlier and the second detection result S2 obtained at the detection cycle "0". Specifically, the amount of positional variation "ΔX" may be calculated as follows.

$$\Delta X = X2(0) - X1(n)$$

Note that in the case where the sensor is installed closer to the first roller than the landing position of the liquid ejection head unit, the control device CTRL may calculate the amount of positional variation of a recording medium at the time the recording medium has moved to the position of the sensor and drive the actuators based on the calculated amount of positional variation.

After calculating the variation "ΔX", the control device CTRL controls the second actuator AC2 (FIG. 15) to move the cyan liquid ejection head unit 210C (FIG. 16) in the orthogonal direction to compensate for the variation "ΔX". In this way, even when the position of a conveyed object varies in the orthogonal direction, the image forming apparatus 110 may be able to accurately form an image on the conveyed object, for example. Also, by calculating the variation based on two detection results output by two sensors, the variation may be calculated without integrating the position information of each of the sensors, for example. In this way, accumulation of detection errors by the sensors may be reduced, for example.

Note that the above calculation method for calculating the variation may similarly be implemented with respect to the other liquid ejection head units. For example, the variation for the black liquid ejection head unit 210K (FIG. 2) may be calculated based on a first detection result S1 corresponding to a detection result output by the second sensor SEN2 and a second detection result S2 corresponding to a detection result output by the black sensor SENK. Similarly, the variation for the magenta liquid ejection head unit 210M (FIG. 2) may be calculated based on a first detection result S1 corresponding to a detection result output by the cyan sensor SENC and a second detection result S2 corresponding to a detection result output by the magenta sensor SENM. Further, the variation for the yellow liquid ejection head unit 210Y (FIG. 2) may be calculated based on a first detection result S1 corresponding to a detection result output by the magenta sensor SENM and a second detection result S2 corresponding to a detection result output by the yellow sensor SENY.

Also, note that the first detection result S1 is not limited to a detection result output by the sensor installed one place upstream (immediately upstream) of the sensor provided for the liquid ejection head unit to be moved. That is, the first detection result S1 may be a detection result output by any sensor that is located upstream of the liquid ejection head unit to be moved. For example, when calculating the variation for the yellow liquid ejection head unit 210Y, the first detection result S1 may be a detection result output by the second sensor SEN2, the black sensor SENK, the cyan sensor SENC, or the magenta sensor SENM.

On the other hand, the second detection result S2 preferably corresponds to a detection result output by the sensor that is closest to the liquid ejection head unit to be moved.

Further, note that in some embodiments, the variation may be detected based on three or more detection results, for example.

By moving a liquid ejection head unit based on a variation calculated from a plurality of detection results output by a plurality of sensors when ejecting liquid onto a recording medium, an image may be accurately formed on the recording medium, for example.

<Processing Result>

Figure 18:
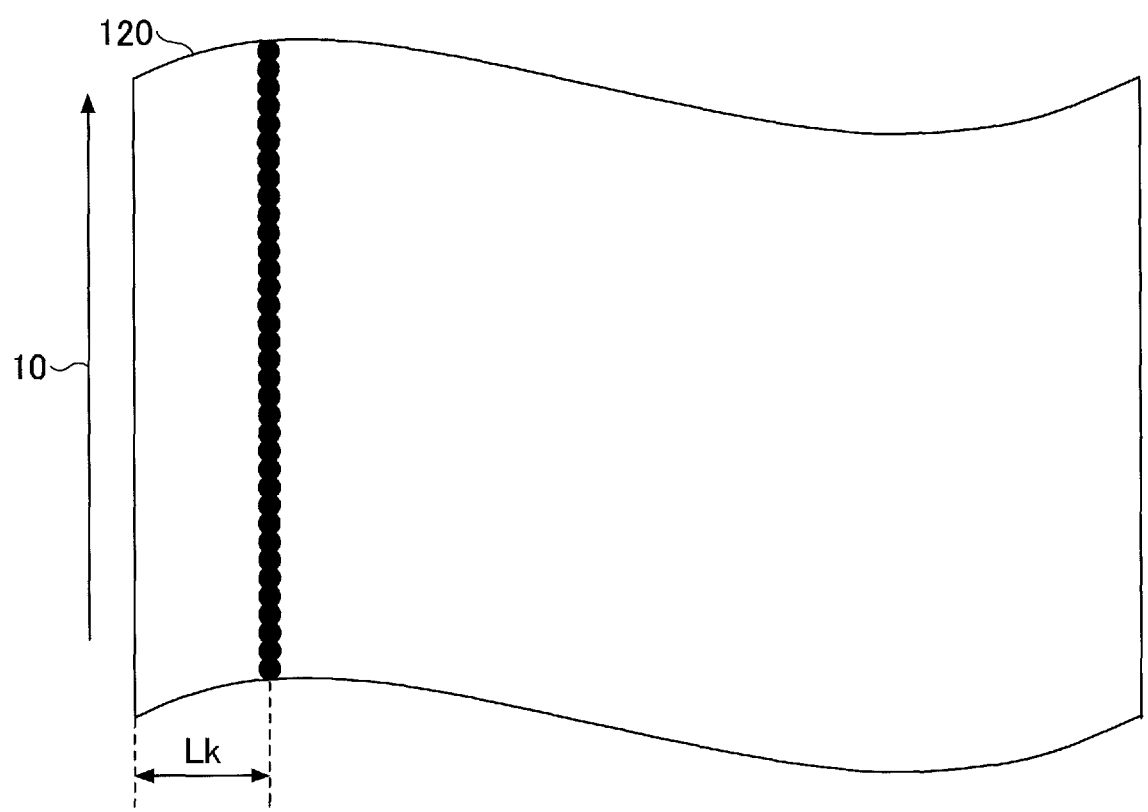
FIG. 18 is a diagram illustrating a test pattern used by the liquid ejection apparatus according to an embodiment of the present invention.

FIG. 18 is a diagram illustrating an example test pattern used by the liquid ejection apparatus according to an embodiment of the present invention. In the present example, the image forming apparatus 110 performs test printing by forming a straight line in the conveying direction 10 using black as an example of a first color. A distance Lk from an edge may be obtained based on the result of the test printing. By adjusting the distance Lk from the edge in the orthogonal direction, manually or using a device, the landing position of black ink corresponding to the first color to be used as a reference may be determined.

Also, note that the installation position of the first sensor is preferably located closer to the first roller than the landing position.

Figure 19:
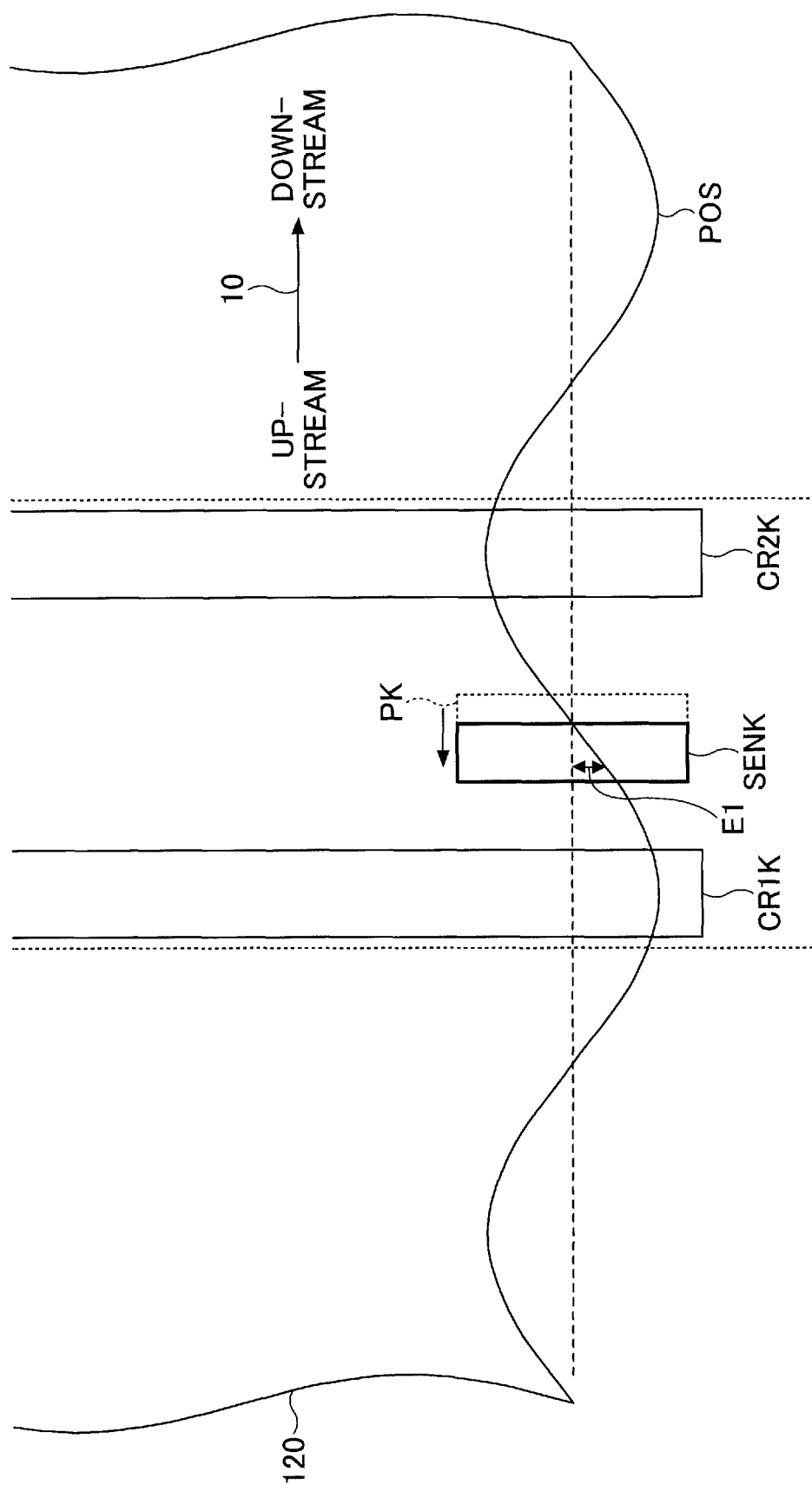
FIG. 19 is a diagram illustrating an example installation position of a first sensor in the liquid ejection apparatus according to an embodiment of the present invention.

FIG. 19 is a diagram illustrating an example installation position of a first sensor of the liquid ejection apparatus according to an embodiment of the present invention. In the following, the installation position of the black sensor SENK is described as an example. The black sensor SENK, which is located between the first roller CR1K and the second roller CR2K, is preferably located closer to the first roller CR1K than the black landing position PK. Note that the shifting distance of the installation position of the black sensor SENK toward the first roller CR1K with respect to the black landing position PK may be determined based on the requisite time for performing control operations and the like. For example, the shifting distance toward the first roller CR1K may be set to "20 mm". In this case, the installation position of the black sensor SENK would be located "20 mm" upstream of the black landing position PK.

In the present example, the black sensor SENK detects a position POS of the web 120 with respect to the orthogonal direction. For example, the position POS correspond to an edge portion of the web 120. Note, however, that the position POS of the web 120 is not limited to a position at the edge portion of the web 120 and may be a position at some other portion of the web 120. As illustrated in FIG. 19, the installation position of the black sensor SENK is not the same as the black landing position PK but is shifted upstream of the black landing position PK. In such case, a detection error E1 is created between the position POS of the web 120 detected by the black sensor PK and a position of the web 120 corresponding to the black landing position PK. As the distance between the installation position of the black sensor SENK and the black landing position PK is reduced, the detection error E1 can be reduced.

Thus, by arranging the installation position of the first sensor to be relatively close to the landing position, the detection error E1 may be controlled to be relatively small. Further, by controlling the detection error E1 to be relatively small, the image forming apparatus 110 may be able to accurately control the landing positions of the liquids in the different colors. Thus, when forming an image, liquids in the different colors may be controlled to land with high accuracy such that the image forming apparatus 110 may be able to reduce color shifts and improve the image quality of the formed image, for example.

Also, with such a configuration, the image forming apparatus 110 may be free from design restrictions, such as a requirement that the distance between the liquid ejection head units be an integer multiple of a circumference of the roller 230 (FIG. 2), for example. As such, the installation positions of the liquid ejection head units may be more freely determined, for example. That is, even when the distance between the liquid ejection head units is not an integer multiple of the circumference of the roller 230, the image forming apparatus 110 may still be able to accurately control the landing positions of liquids in the different colors that are ejected by the liquid ejection head units, for example.

Comparative Example

FIG. 20 is a diagram illustrating an example hardware configuration according to a first comparative example. In the illustrated first comparative example, a position of the web 120 is detected before each liquid ejection head unit reaches its corresponding liquid landing position. For example, in the first comparative example, the installation positions of the sensors SENK, SENC, SENM, and SENY may respectively be located "200 mm" upstream of the position directly below their corresponding liquid ejection head units 210K, 210C, 210M, and 210Y. Based on detection results obtained by the sensors in this case, the image forming apparatus 110 according to the first comparative example may move the liquid ejection head units to compensate for the variations in the position of the web 120.

Figure 21:
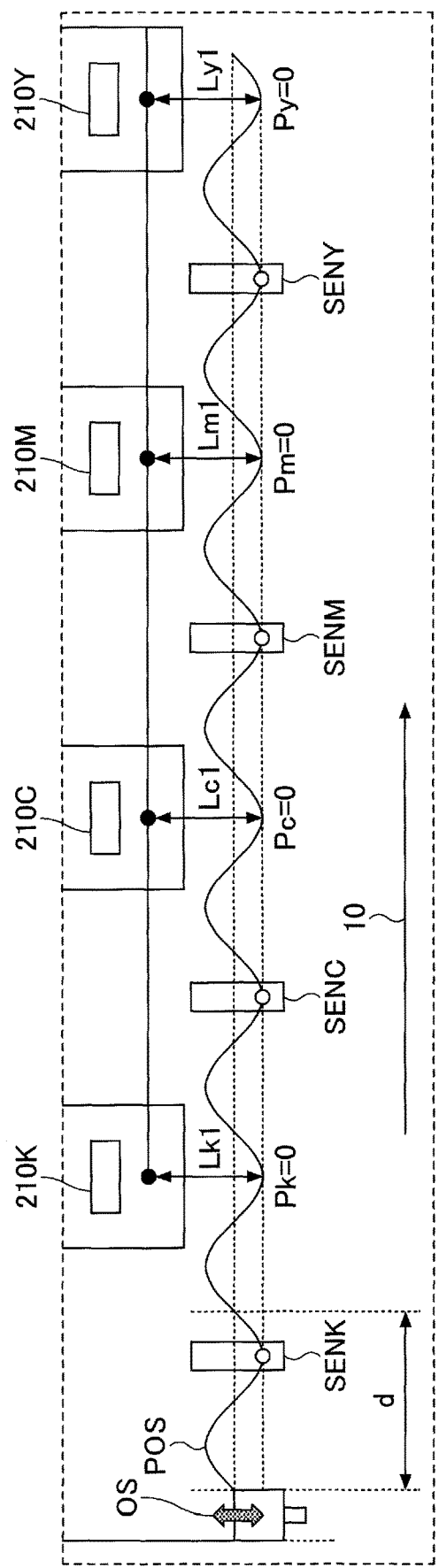
FIG. 21 is a diagram illustrating an example processing result of an overall process implemented by the liquid ejection apparatus according to the first comparative example.

FIG. 21 is a diagram illustrating an example processing result of an overall process implemented by the liquid ejection apparatus according to the first comparative example. In the first comparative example, the liquid ejection head units are installed so that the distance between the liquid ejection head units is an integer multiple of the circumference d of the roller 230. In this case, the difference between the position of the web 120 detected by each sensor and the position of the web directly below each liquid ejection head unit can be controlled to be "0". Thus, in the first comparative example, provided the respective distances from the web edge of the landing positions of the black, cyan, magenta, and yellow inks on the web 120 are denoted as "Lk1", "Lc1", "Lm1", and "Ly1", a relationship "Lk1=Lc1=Lm1=Ly1" may be established. In this way, positional variations may be corrected in the first comparative example.

Figure 22:
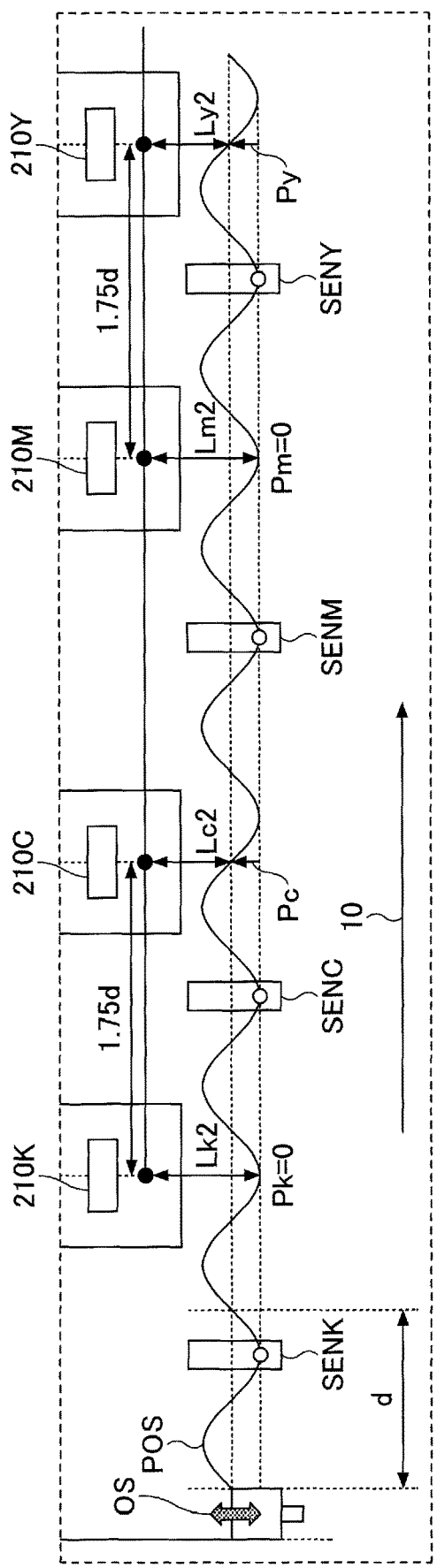
FIG. 22 is a diagram illustrating an example processing result of an overall process implemented by a liquid ejection apparatus according to a second comparative example.

FIG. 22 is a diagram illustrating an example processing result of an overall process implemented by the liquid ejection apparatus according to a second comparative example. Note that the second comparative example uses the same hardware configuration as that of the first comparative example. The second comparative example differs from the first comparative example in that the distance between the black liquid ejection head unit 210K and the cyan liquid ejection head unit 210C and the distance between the magenta liquid ejection head unit 210M and the yellow liquid ejection head unit 210Y are arranged to be "1.75d". That is, in the second comparative example, the distance between the black liquid ejection head unit 210K and the cyan liquid ejection head unit 210C and the distance between the magenta liquid ejection head unit 210M and the yellow liquid ejection head unit 210Y are not integer multiples of the circumference d of the roller 230.

In the second comparative example illustrated in FIG. 22, the difference between a position of the web 120 detected by the black sensor SENK and the position of the web 120 below the black liquid ejection head unit 210K is denoted as "Pk". Similarly, the difference between a position of the web 120 detected by the cyan sensor SENC and the position of the web 120 below the cyan liquid ejection head unit 210C is denoted as "Pc". Also, the difference between a position of the web 120 detected by the magenta sensor SENM and the position of the web 120 below the magenta liquid ejection head unit 210M is denoted as "Pm". Further, the difference between a position of the web 120 detected by the yellow sensor SENY and the position of the web 120 below the yellow liquid ejection head unit 210Y is denoted as "Py". Also, provided the respective distances from the web edge of the landing positions of the black, cyan, magenta, and yellow inks on the web 120 are denoted as "Lk2", "Lc2", "Lm2", and "Ly2", the relationship between the respective distances may be represented by the following equations (2).

$$Lc2=Lk2-Pc$$

$$Lm2=Lk2$$

$$Ly2=Lk2-Py \quad (2)$$

Based on the above, "Lk2=Lm2≠Lc2=Ly2". That is, in the second comparative example where the distance between the liquid ejection head units 210K and 210C and the distance between the liquid ejection head units 210M and 210Y are not integer multiples of the circumference d of the roller 230, the position of the web 120 directly below the cyan liquid ejection head unit 210C and the position of the web 120 directly below the yellow liquid ejection head unit 210Y are respectively shifted from the position of the web 120 detected by the cyan sensor SENC and the position of the web 120 detected by the yellow sensor SENY by shift amounts "Pc" and "Py" that are not equal to zero. That is, in the second comparative example, variations in the position of the web 120 cannot be corrected such that color shifts may be more likely to occur, for example.

Figure 23:
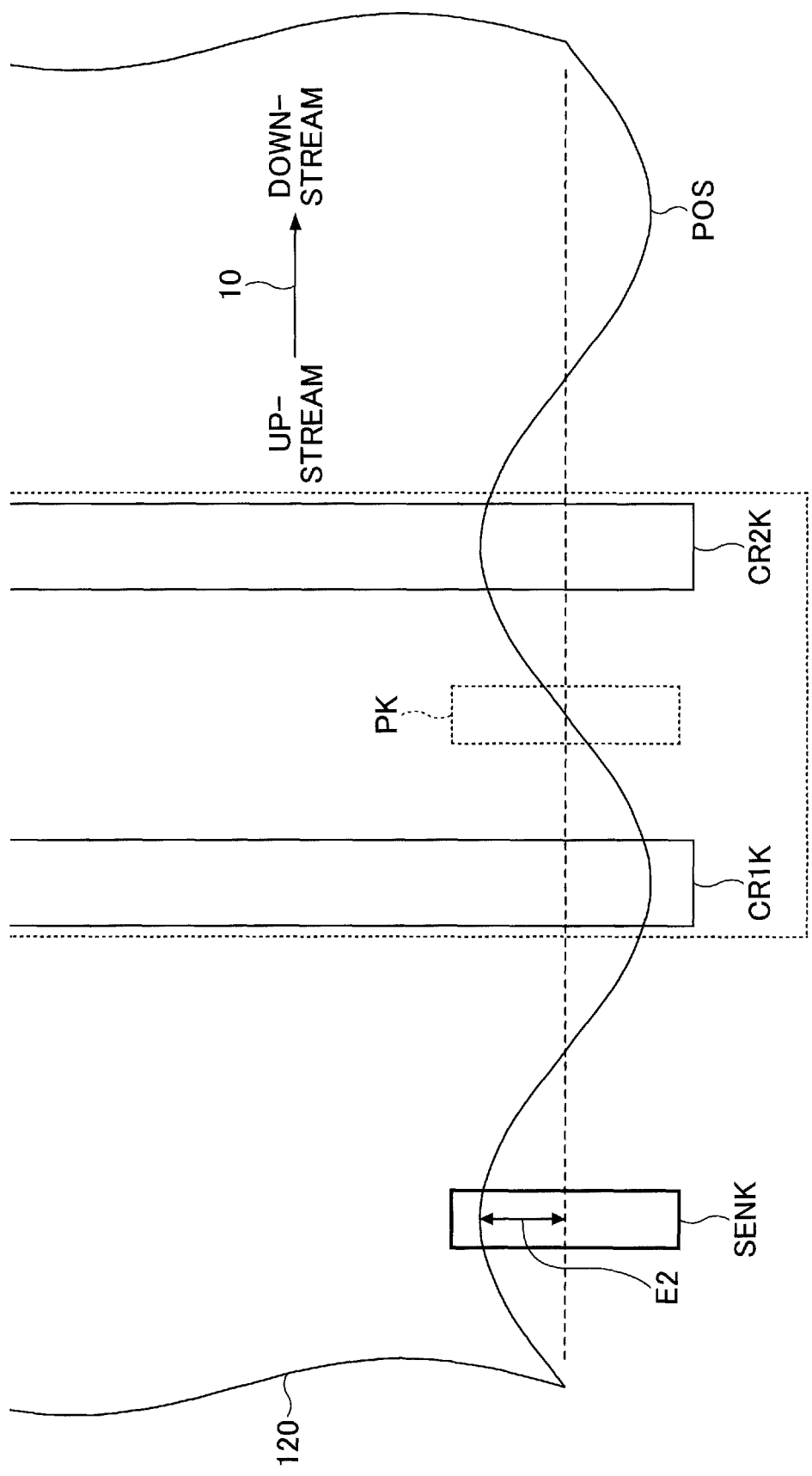
FIG. 23 is a diagram illustrating an example installation position of a sensor in a liquid ejection apparatus according to a third comparative example.

FIG. 23 is a diagram illustrating an example sensor installation position of a liquid ejection apparatus according to a third comparative example. As illustrated in FIG. 23, in the third comparative example, the black sensor SENK is installed at a position relatively far from the black landing position PK as compared with the sensor installation position illustrated in FIG. 19, for example. In such case, a detection error E2 tends to increase such that the landing positions of liquids in the different colors may not be as accurately controlled as desired, for example.

<Functional Configuration of Liquid Ejection Apparatus>

Figure 24:
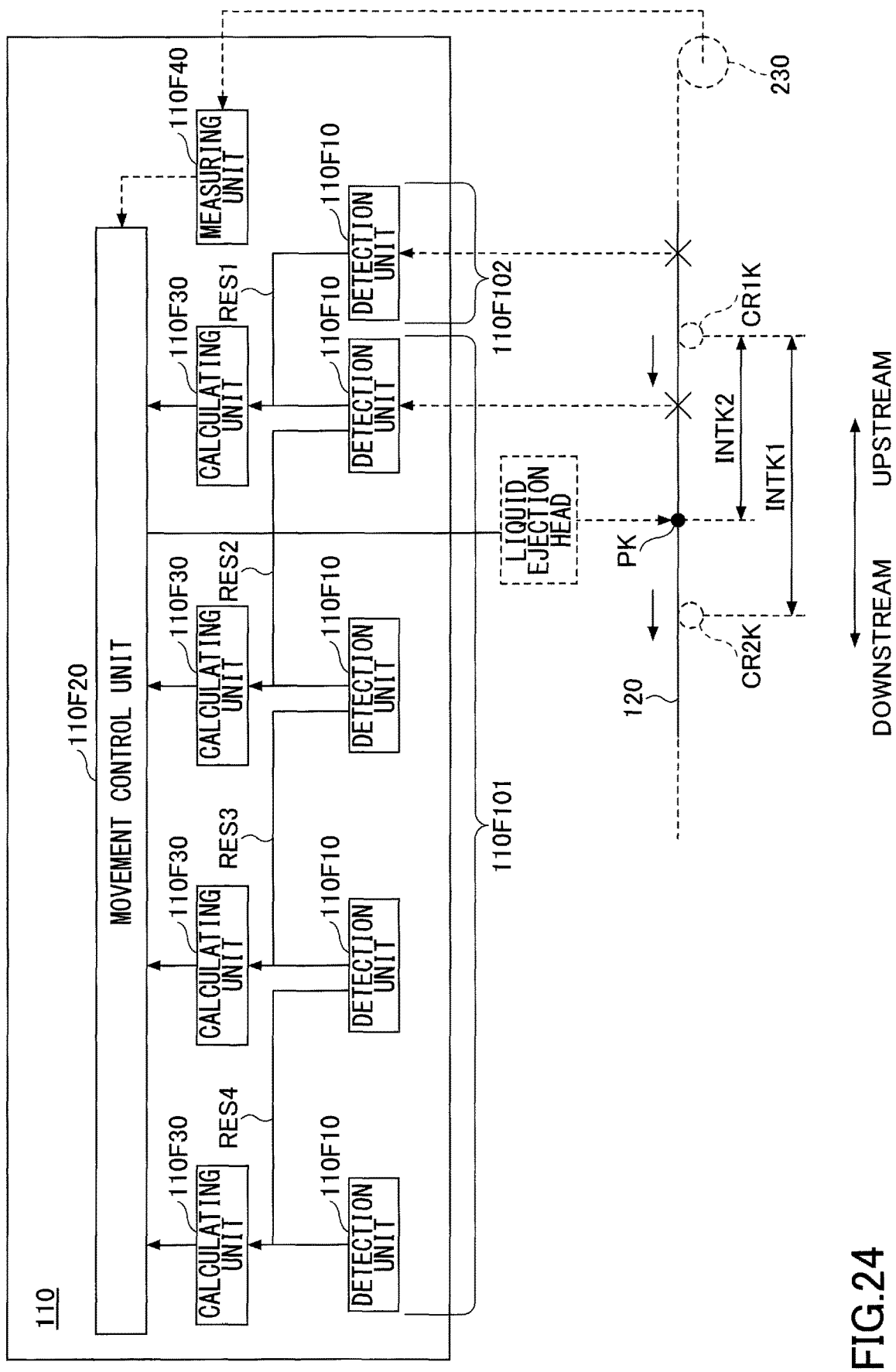
FIG. 24 is a block diagram illustrating an example functional configuration of the liquid ejection apparatus according to an embodiment of the present invention.

FIG. 24 is a block diagram illustrating an example functional configuration of the liquid ejection apparatus according to an embodiment of the present invention. In FIG. 24, the image forming apparatus 110 includes a plurality of liquid ejection head units and a detection unit 110F10 for each of the liquid ejection head units. Also, the image forming apparatus 110 includes a movement control unit 110F20. Further, the image forming apparatus 110 includes a calculating unit 110F30 that is provided for each of the liquid ejection head units.

The plurality of liquid ejection head units are arranged at different positions along a conveying path for a conveyed object as illustrated in FIG. 2, for example. In the following, the black liquid ejection head unit 210K of FIG. 2 is described as an example liquid ejection head unit of the plurality of liquid ejection head units.

Also, as illustrated in FIG. 24, the image forming apparatus 110 of the present embodiment preferably includes a measuring unit 110F40.

In FIG. 24, the detection unit 110F10 is provided for each of the liquid ejection head units. Specifically, in the image forming apparatus 110 having the configuration as illustrated in FIG. 2, for example, four detection units 110F10 are provided for the four liquid ejection head units 210K, 210C, 210M, and 210Y. The detection units 110F10 provided for the respective liquid ejection head units are referred to as first detection units 110F101. In addition, a detection unit 110F10 provided upstream of the first detection units 110F101 is referred to as second detection unit 110F102. Each of the above detection units 110F10 detects a position of the web 120 (recording medium) in the orthogonal direction. Note that each of the detection units 110F10 may be implemented by the hardware configuration as illustrated in FIG. 4, for example. Also, note that each of the first detection units 110F101 and the second detection unit 110F102 includes at least one detection unit 110F10.

In the present embodiment, the first roller is provided for each liquid ejection head unit. Specifically, in the image forming apparatus 110 having the configuration as illustrated in FIG. 2, the number of the first rollers would be the same as the number of the liquid ejection head units, i.e., four. The first roller is a roller used to convey a recording medium (e.g., web 120) to a landing position such that a liquid ejection head unit may be able to eject liquid onto a predetermined position of the recording medium. That is, the first roller is a roller installed upstream of the landing position. For example, the first roller CR1K is provided for the black liquid ejection head unit 210K (see FIG. 2).

The second roller is provided for each liquid ejection head unit. Specifically, in the image forming apparatus 110 having the configuration as illustrated in FIG. 2, the number of second rollers would be the same as the number of liquid discharge head units, i.e., four. The second roller is a roller used for conveying the recording medium from the landing position to another position. That is, the second roller is a roller installed downstream of the landing position. For example, the second roller CR2K is provided for the black liquid ejection head unit 210K (see FIG. 2).

The calculating unit 110F30 calculates an amount of positional variation by comparing a plurality of detection results. For example, the calculating unit 110F30 may calculate an amount of positional variation by implementing the calculation method as illustrated in FIG. 17. Note that the calculating unit 110F30 may be implemented by the CPU 221 of FIG. 15, for example.

The movement control unit 110F20 moves the liquid ejection head units based on the detection results obtained by the plurality of detection units 110F10. For example, the movement control unit 110F20 may move the liquid ejection head units to compensate for the variations calculated by the calculating units 110F30. Note that the movement control unit 110F20 may be implemented by the hardware configuration and the moving mechanism as illustrated in FIGS. 15 and 16, for example. Also, note that the movement control unit 110F20 may be configured to control a plurality of liquid ejection heads as in the illustrated example. Alternatively, the movement control unit 110F20 may be separately provided for each of the liquid ejection head units, for example.

By configuring the movement control unit 110F20 to move the liquid ejection head units based on a plurality of detection results obtained by a plurality of detection units 110F10, the image forming apparatus 110 may be able to more accurately control the landing positions of the ejected liquids in the orthogonal direction, for example.

Also, the position at which the first detection unit 110F101 performs detection, i.e., the installation position of the first sensor, is preferably located close to the landing position. For example, the installation position of the black sensor SENK is preferably close to the black landing position PK, such as somewhere within the range INTK1 between the first roller CR1K and the second roller CR2K. That is, when detection is performed at a position within the range INTK1, for example, the image forming apparatus 110 may be able to accurately detect a position of a recording medium in the orthogonal direction.

Further, the position at which the first detection unit 110F10 performs detection, i.e., the installation position of the first sensor, is preferably located upstream of the landing position. For example, the installation position of the black sensor SENK is preferably located upstream of the black landing position PK, such as somewhere within the black upstream section INTK2, between the first roller CR1K and the second roller CR2K. When detection is performed at a position within the black upstream section INTK2, for example, the image forming apparatus 110 may be able to accurately detect a position of a recording medium in the orthogonal direction.

As described above, in a liquid ejection apparatus according to an embodiment of the present invention, a position of a conveyed object, such as a recording medium, in the orthogonal direction is detected at each of a plurality of liquid ejection head units at a detection position close to each of the liquid ejection head units. Also, the liquid ejection apparatus according to an embodiment of the present invention detects a position of the conveyed object at the upstream side of a liquid ejection head unit to be moved. The combination of detection results to be used may vary depending on the liquid ejection head unit to be moved. For example, a combination of a detection result obtained by the detection unit 110F10 located closest to the liquid ejection head unit to be moved and a detection result obtained by a detection unit 110F10 installed one place upstream (immediately upstream) of the closest detection unit 110F10 may be used to calculate an amount of positional variation of the conveyed object. In this case, a first combination RES1, a second combination RES2, a third combination RES3, and a fourth combination RES4 of detection results as illustrated in FIG. 24 may be used to calculate the amounts of positional variation for the respective liquid ejection head units. That is, the calculating units 110F30 for the respective liquid ejection head units may calculate the amounts of positional variation for the respective liquid ejection head units based on the first combination RES1, the second combination RES2, the third combination RES3, and the fourth combination RES4, for example. By calculating the amounts of positional variation for the respective liquid ejection head units based on the above combinations of detection results, for example, accuracy of the calculated amounts of positional variation may be uniform.

Note that when a position of a conveyed object is detected using a single detection unit, a detection range subject to detection may be relatively small. As such, an amount of positional variation calculated using a detection result obtained by one single detection unit may not be as accurate as desired. On the other hand, by calculating an amount of positional variation based on a combination of detection results obtained by a plurality of detection units as in the present embodiment, the amount of positional variation may be more accurately calculated as compared to a case where the amount of positional variation is calculated based on a detection result obtained by a single detection unit. Also, by combining a plurality of detection results of a plurality of detection units, an amount of positional variation of a conveyed object occurring between the sensors, and an amount of positional variation of the conveyed object occurring between the sensor and the liquid ejection head unit may be calculated, for example. That is, by combining a plurality of detection results obtained by a plurality of detection units as in the present embodiment, the liquid ejection apparatus may be able to accurately compensate for the positional variations.

Then, based on the amounts of variation calculated for the respective liquid ejection head units using the combinations of detection results, the liquid ejection apparatus according to an embodiment of the present invention moves the liquid ejection head units. In this way, the liquid ejection apparatus according to an embodiment of the present invention may be able to accurately correct deviations in the landing positions of ejected liquid in the orthogonal direction as compared with the first comparative example and the second comparative example as illustrated in FIGS. 21 and 22, for example.

Also, in the liquid ejection apparatus according to an embodiment of the present invention, the distance between the liquid ejection head units does not have to be an integer multiple of the circumference of a roller as in the first comparative example (FIG. 21), and as such, restrictions for installing the liquid ejection head units may be reduced.

Further, in the case of forming an image on a recording medium by ejecting liquid, by improving the accuracy of the landing positions of ejected liquids in the different colors, the liquid ejection apparatus according to an embodiment of the present invention may be able to improve the image quality of the formed image.

Also, by providing the measuring unit 110F40, the position of a recording medium such as the web 120 may be more accurately detected. For example, a measuring device such as an encoder may be installed with respect to the rotational axis of the roller 230. In such case, the measuring unit 110F30 may measure the amount of movement of the recording medium using the encoder. When such measurement obtained by the measuring unit 110F40 is input, the image forming apparatus 110 may be able to more accurately detect a position of a recording medium in the conveying direction, for example.

<Modifications>

Note that in some embodiments, the installation position of the first sensor may be located directly below the landing position of each liquid ejection head unit, for example. By arranging the first sensor directly below the landing position, an amount of movement of a position directly below the sensor may be accurately detected by the first sensor. Thus, in a case where calculation of the amount of movement can be accurately executed, the sensor is preferably arranged close to a position directly below the landing position of the liquid ejection head unit. On the other hand, the sensor does not have to be arranged directly below each liquid ejection head unit, and even in such case, similar calculation operations may be performed.

Also, note that the liquid ejection apparatus according to an embodiment of the present invention may be implemented by a liquid ejection system including at least one liquid ejection apparatus. For example, in some embodiments, the black liquid ejection head unit 210K and the cyan liquid ejection head unit 210C may be included in one housing of one liquid ejection apparatus, and the magenta liquid ejection head unit 210M and the yellow liquid ejection head unit 210Y may be included in another housing of another liquid ejection apparatus, and the liquid ejection apparatus according to an embodiment of the present invention may be implemented by a liquid ejection system including both of the above liquid ejection apparatuses.

Also, note that the liquid ejected by the liquid ejection apparatus and the liquid ejection system according to embodiments of the present invention is not limited to ink but may be other types of recording liquid or fixing agent, for example. That is, the liquid ejection apparatus and the liquid ejection system according to embodiments of the present invention may also be implemented in applications that are configured to eject liquid other than ink.

Also, the liquid ejection apparatus and the liquid ejection system according to embodiments of the present invention are not limited to applications for forming a two-dimensional image. For example, embodiments of the present invention may also be implemented in applications for forming a three-dimensional object.

Also, in some embodiments, one member may be arranged to act as both the first support member and the second support member. For example, the first support member and the second support member may be configured as follows.

Figure 25:
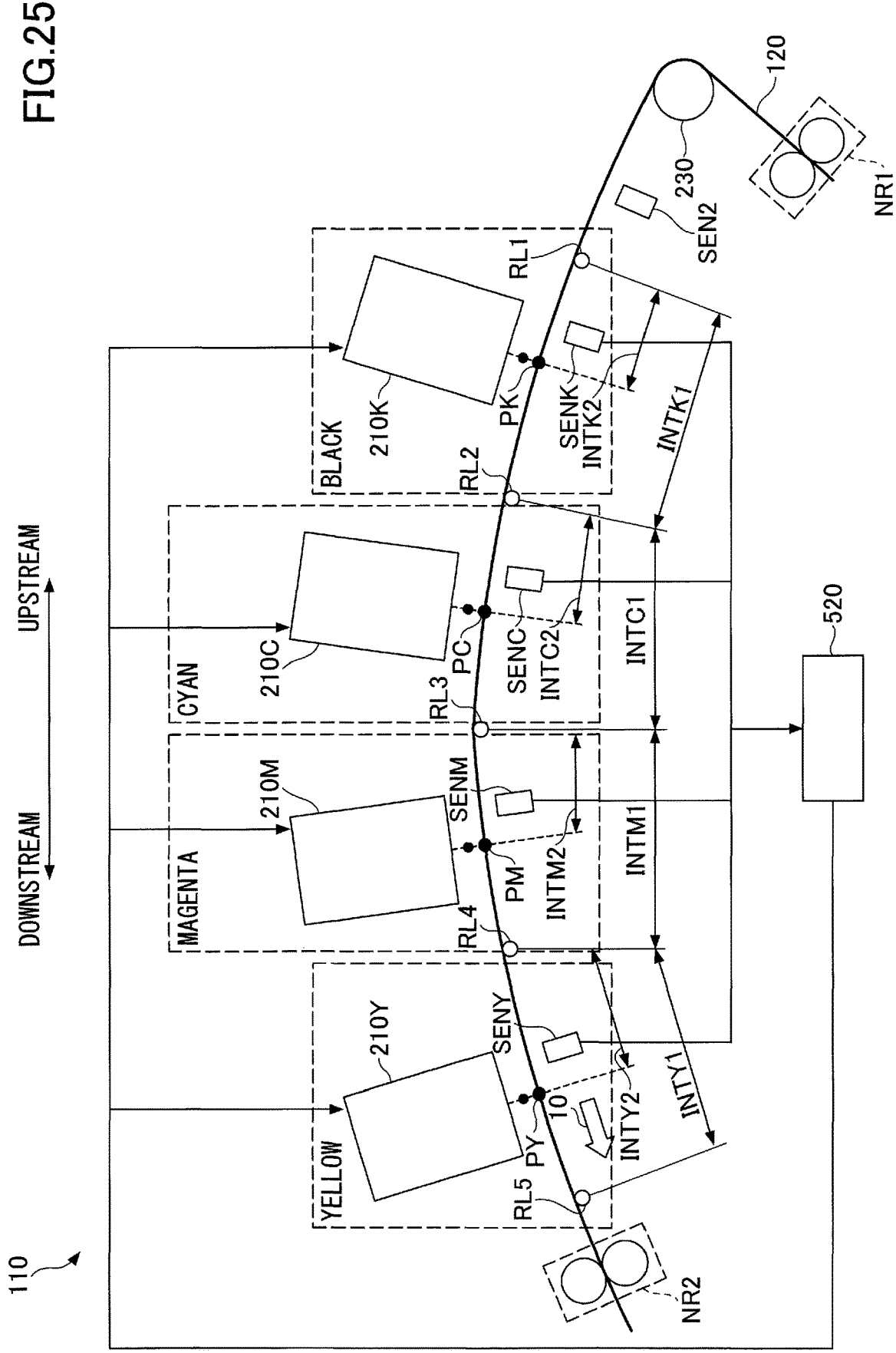
FIG. 25 is a schematic diagram illustrating an example modification of the liquid ejection apparatus according to an embodiment of the present invention.

FIG. 25 is a schematic diagram illustrating an example modified configuration of the liquid ejection apparatus according to an embodiment of the present invention. In the liquid ejection apparatus illustrated in FIG. 25, the configuration of the first support member and the second support member differs from that illustrated in FIG. 2. Specifically, in FIG. 25, a first member RL1, a second member RL2, a third member RL3, a fourth member RL4, and a fifth member RL5 are arranged as the first support member and the second support member. That is, in FIG. 25, the second member RL2 acts as the second support member for the black liquid ejection head unit 210K and the first support member for the cyan liquid ejection head unit 210C. Similarly, the third member RL3 acts as the second support member for the cyan liquid ejection head unit 210C and the first support member for the magenta liquid ejection head unit 210M. Further, the fourth member RL4 acts as the second support member for the magenta liquid ejection head unit 210M and the first support member for the yellow liquid ejection head unit 210Y. As illustrated in FIG. 25, in some embodiments, one support member may be configured to act as the second support member of an upstream liquid ejection head unit and the first support member of a downstream liquid ejection head unit, for example. Also, in some embodiments, a roller or a curved plate may be used as the support member acting as both the first support member and the second support member, for example.

Further, the conveyed object is not limited to recording medium such as paper. That is, the conveyed object may be any material onto which liquid can be ejected including paper, thread, fiber, cloth, leather, metal, plastic, glass, wood, ceramic materials, and combinations thereof, for example.

Also, embodiments of the present invention may be implemented by a computer program that causes a computer of an image forming apparatus and/or an information processing apparatus to execute a part or all of a liquid ejection method according to an embodiment of the present invention, for example.

Although the present invention has been described above with reference to certain illustrative embodiments, the present invention is not limited to these embodiments, and numerous variations and modifications may be made without departing from the scope of the present invention.

What is claimed is:

1. A liquid ejection apparatus, comprising:
a plurality of liquid ejection head units that are configured to eject liquid onto a first side of a conveyed object at different positions along a conveying path for conveying the conveyed object;
a first support member that supports the conveyed object and is provided upstream of a landing position of the liquid ejected onto the first side of the conveyed object by a corresponding liquid ejection head unit of the plurality of liquid ejection head units;
a second support member that supports the conveyed object and is provided downstream of the landing position of the corresponding liquid ejection head unit;
at least one detection unit that is
installed between the first support member and the second support member,
configured to detect a position of the conveyed object upstream of the landing position with respect to an orthogonal direction that is orthogonal to a conveying direction of the conveyed object; and
a movement control unit that is configured to move each liquid ejection head unit of the plurality of liquid ejection head units based on at least two detection results output by the detection unit, wherein
each liquid ejection head unit of the plurality of liquid ejection head units faces the first side of the conveyed object, and
the detection unit faces a second side of the conveyed object, the second surface being an opposite side of the conveyed object from the first side.

2. The liquid ejection apparatus according to claim 1, wherein
the first support member is arranged downstream of a landing position of an upstream liquid ejection head unit located upstream of the corresponding liquid ejection head unit; and
the second support member is arranged upstream of a landing position of a downstream liquid ejection head unit located downstream of the corresponding liquid ejection head unit.

3. The liquid ejection apparatus according to claim 1, wherein the first support member and the second support member are provided with respect to the each liquid ejection head unit of the plurality of liquid ejection head units.

4. The liquid ejection apparatus according to claim 1, wherein the detection unit is positioned between the first support member and the landing position of the corresponding liquid ejection head unit.

5. The liquid ejection apparatus according to claim 1, wherein the movement control unit moves the each liquid ejection bead unit in the orthogonal direction that is orthogonal to the conveying direction of the conveyed object.

6. The liquid ejection apparatus according to claim 1, wherein the detection unit uses an optical sensor.

7. The liquid ejection apparatus according to claim 6, wherein the detection unit is configured to obtain the detection results based on a pattern included in the conveyed object.

8. The liquid ejection apparatus according to claim 7, wherein
the pattern is generated by interference of light irradiated on a roughness formed on the conveyed object; and
the detection unit is configured to obtain the detection results based on an image capturing the pattern of the conveyed object.

9. The liquid ejection apparatus according to claim 1, further comprising:
a measuring unit configured to measure an amount of movement in the conveying direction of the conveyed object;
wherein the liquid is ejected based on the amount of movement measured by the measuring unit and the at least two detection results.

10. The liquid ejection apparatus according to claim 1, wherein the conveyed object is a long continuous sheet extending in the conveying direction.

11. The liquid ejection apparatus according to claim 1, further comprising:
a calculating unit that is provided with respect to the each liquid ejection head unit of the plurality of liquid ejection head units and is configured to calculate an amount of positional variation of the conveyed object by comparing the at least two detection results including a first detection result and a second detection result;
wherein the movement control unit moves a liquid ejection head unit of the plurality of liquid ejection head units based on the amount of positional variation calculated with respect to the liquid ejection head unit;
wherein the first detection result is detected by the detection unit that is installed upstream of the liquid ejection head unit to be moved by the movement control unit; and
wherein the second detection result is detected by the detection unit that is installed closest to the liquid ejection head unit to be moved by the movement control unit.

12. The liquid ejection apparatus according to claim 11, wherein the first detection result is detected by the detection unit that is installed immediately upstream of the liquid ejection head unit to be moved by the movement control unit.

13. The liquid ejection apparatus according to claim 1, wherein the detection unit and the second detection are installed at positions that are equidistant from each other.

14. A liquid ejection system including at least one liquid ejection apparatus, the liquid ejection system comprising:
a plurality of liquid ejection head units that are configured to eject liquid onto a first side of a conveyed object at different positions along a conveying path for conveying the conveyed object;
a first support member that supports the conveyed object and is provided upstream of a landing position of the liquid ejected onto the first side of the conveyed of by a corresponding liquid ejection head unit of the plurality of liquid ejection head units;
a second support member that supports the conveyed object and is provided downstream of the landing position of the corresponding liquid ejection head unit;
at least one detection unit that is
installed between the first support member and the second support member,
configured to detect a position of the conveyed object upstream of the landing position with respect to an orthogonal direction that is orthogonal to a conveying direction of the conveyed object; and
a movement control unit that is configured to move each liquid ejection head unit of the plurality of liquid ejection bead units based on at least two detection results output by the detection unit, wherein
each liquid ejection head unit of the plurality of liquid ejection head units faces the first side of the conveyed object, and
the detection unit faces a second side of the conveyed object, the second side being an opposite side of the conveyed object from the first side.

15. A liquid ejection method that is implemented by a liquid ejection apparatus including
a plurality of liquid ejection head units that are configured to eject liquid onto a first side of a conveyed object at different positions along a conveying path for conveying the conveyed object;
a first support member that supports the conveyed object and is provided upstream of a landing position of the liquid ejected onto the first side of the conveyed object by a corresponding liquid ejection head unit of the plurality of liquid ejection head units;
a second support member that supports the conveyed object and is provided downstream of the landing position of the corresponding liquid ejection head unit; and
at least one detection unit that is
installed between the first support member and the second support member,
configured to detect a position of the conveyed object upstream of the landing position with respect to an orthogonal direction that is orthogonal to a conveying direction of the conveyed object, wherein
each liquid ejection head unit of the plurality of liquid ejection head units faces the first side of the conveyed object, and
the detection unit faces a second side of the conveyed object, the second side being an opposite side of the conveyed object from the first side;
the liquid ejection method comprising:
moving each liquid ejection head unit of the plurality of liquid ejection head units based on at least two detection results output by the detection unit.

* * * * *